(12) United States Patent
Maejima et al.

(10) Patent No.: US 6,200,221 B1
(45) Date of Patent: Mar. 13, 2001

(54) POWER TRANSMISSION APPARATUS

(75) Inventors: Enjiro Maejima; Katsunao Busujima; Yoshihiro Kurosu, all of Gunma (JP)

(73) Assignee: Ogura Clutch Co., Ltd. (JP)

( * ) Notice: Subject to any disclaimer, the term of this patent is extended or adjusted under 35 U.S.C. 154(b) by 0 days.

(21) Appl. No.: 09/459,179

(22) Filed: Dec. 10, 1999

(30) Foreign Application Priority Data

| Dec. 11, 1998 | (JP) | 10-353007 |
| Apr. 26, 1999 | (JP) | 11-118068 |
| Oct. 28, 1999 | (JP) | 11-307827 |

(51) Int. Cl.[7] .................................................. F16D 7/02
(52) U.S. Cl. ................................ 464/45; 464/46; 464/30; 192/56.55
(58) Field of Search ............................. 192/56.5, 56.55; 464/30, 42, 45, 43, 46, 41

(56) References Cited

U.S. PATENT DOCUMENTS

| 3,503,478 | * | 3/1970 | Neumann | 192/56.55 |
| 4,043,149 | * | 8/1977 | Tuninetti | 464/46 |
| 4,542,812 | * | 9/1985 | Westley | 464/46 |

FOREIGN PATENT DOCUMENTS

| 864454A2 | 9/1998 | (EP) . |
| 6-39105 U | 10/1994 | (JP) . |
| 10-252857 | * 9/1998 | (JP) . |
| 12-179569 | * 6/2000 | (JP) . |

* cited by examiner

*Primary Examiner*—Lynne H. Browne
*Assistant Examiner*—Aaron Dunwoody
(74) *Attorney, Agent, or Firm*—Blakely Sokoloff Taylor & Zafman

(57) ABSTRACT

In a power transmission apparatus, a torque limiter mechanism has a plurality of holding portions, a disc plate and a flange, and an elastic member. The plurality of holding portions are fixed to either one of a pulley and a hub and aligned substantially equidistantly in a circumferential direction. The disc plate and flange are provided to either one of the pulley and the hub and oppose the holding portions. The elastic member is frictionally connected to the holding portions and the disc plate and flange, and is fixed to the remaining one of the pulley and the hub. The elastic member has connecting portions and an elastic support. The connecting portions are frictionally connected to the holding portions and the disc plate and flange, and correspond in number to the holding portions. The elastic support is fixed to the remaining one of the pulley and the hub, and is imparted with an elastic restoration force for disengaging the connecting portions toward either one of upper and lower surfaces of the holding portions. The connecting portions and the holding portions, and the connecting portions and the disc plate and flange are frictionally connected to each other, and the elastic support is elastically deformed in an axial direction.

12 Claims, 22 Drawing Sheets

POWER TRANSMISSION APPARATUS

BACKGROUND OF THE INVENTION

The present invention relates to a power transmission apparatus and, more particularly, to a power transmission apparatus having a torque limiter mechanism such as a compressor for an automobile air conditioner.

As a conventional power transmission apparatus of this type, for example, one described in Japanese Utility Model Publication No. 6-39105 is known. In the power transmission apparatus described in this reference, fitting holes are formed in axially opposing side surfaces of the pulley (driving rotary member) of a compressor (driven device) and a hub (driven rotary member) mounted on the rotating shaft of the compressor. A connecting member comprised of a member that can be broken upon application of an overload is press-fitted in these fitting holes to form a torque limiter mechanism. When an overload acts on the rotating shaft, a power from a vehicle engine (driving device) breaks the connecting member.

In the conventional power transmission apparatus described above, the connecting member is broken when an overload is temporarily applied to the rotating shaft due to some reason. The compressor cannot be driven again unless the connecting member is exchanged for a new one.

In order to solve the above problem, a power transmission apparatus disclosed in, e.g., EP 0864454 A2 is proposed. In this power transmission apparatus, a washer is interposed between an inner holding member and an arc-shaped projection formed on the flange of a hub. When the inner holding member is pressed by a coned disc spring through another washer, the inner holding member is connected to the two washers through frictional engagement. When an overload is applied, the hub washer is moved into a recess formed in the arc-shaped projection to displace the inner holding member toward the hub, so that frictional engagement is canceled. Therefore, power transmission can be disconnected in a nondestructive manner.

In the power transmission apparatus disclosed in EP 0864454 A2 described above, after power transmission is disconnected, the flange of the inner holding member, the arc-shaped projection of the hub, and the washers slide on each other. Due to this structure, a drag torque may be generated, or a sliding noise and friction heat may be easily generated. In particular, when friction heat is generated, it degrades a rubber member connecting the outer and inner holding members to each other. When frictional engagement is canceled and power transmission is disconnected, the inner holding member and the washers become movable in the axial direction. Then, when the inner holding member and the washers are moved by vibration or the like, noise is produced.

SUMMARY OF THE INVENTION

It is, therefore, a principal object of the present invention to provide a power transmission apparatus in which noise or friction heat is not generated due to its structure even when power transmission is disconnected because of an overload.

In order to achieve the above object, according to the present invention, there is provided a power transmission apparatus comprising a driving rotary member rotatably supported on an outer surface of a cylindrical housing of a driven device through a bearing, a driven rotary member attached to a rotating shaft coaxially arranged in the cylindrical housing of the driven device, and a torque limiter mechanism for connecting the driven rotary member and the driving rotary member to each other and limiting torque transmission from the driving rotary member to the driven rotary member when an overload is applied to the driven rotary member, the torque limiter mechanism having a plurality of holding portions fixed to either one of the driving rotary member and the driven rotary member and aligned substantially equidistantly in a circumferential direction, an opposing portion provided to either one of the driving rotary member and the driven rotary member and opposing the holding portions, and an elastic member frictionally connected to the holding portions and the opposing portion and fixed to the remaining one of the driving rotary member and the driven rotary member, the elastic member having connecting portions frictionally connected to the holding portions and the opposing portion and corresponding in number to the holding portions, and an elastic support fixed to the remaining one of the driving rotary member and the driven rotary member and imparted with an elastic restoration force for disengaging the connecting portions toward either one of upper and lower surfaces of the holding portions, wherein the connecting portions and the holding portions, and the connecting portions and the opposing portion are frictionally connected to each other, and the elastic support elastically deforms in an axial direction.

DESCRIPTION OF THE PREFERRED EMBODIMENTS

The present invention will be described in detail by way of embodiments shown in the accompanying drawings.

FIRST PREFERRED EMBODIMENT

Figure 1:
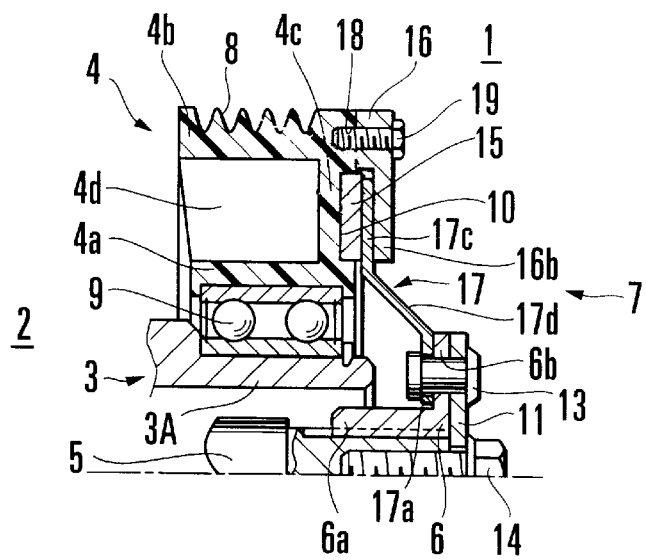
FIG. 1 is a sectional view, taken along the line I—I of FIG. 2, of a power transmission apparatus according to the first embodiment of the present invention, when it is connected to a torque limiter mechanism.
Figure 2:
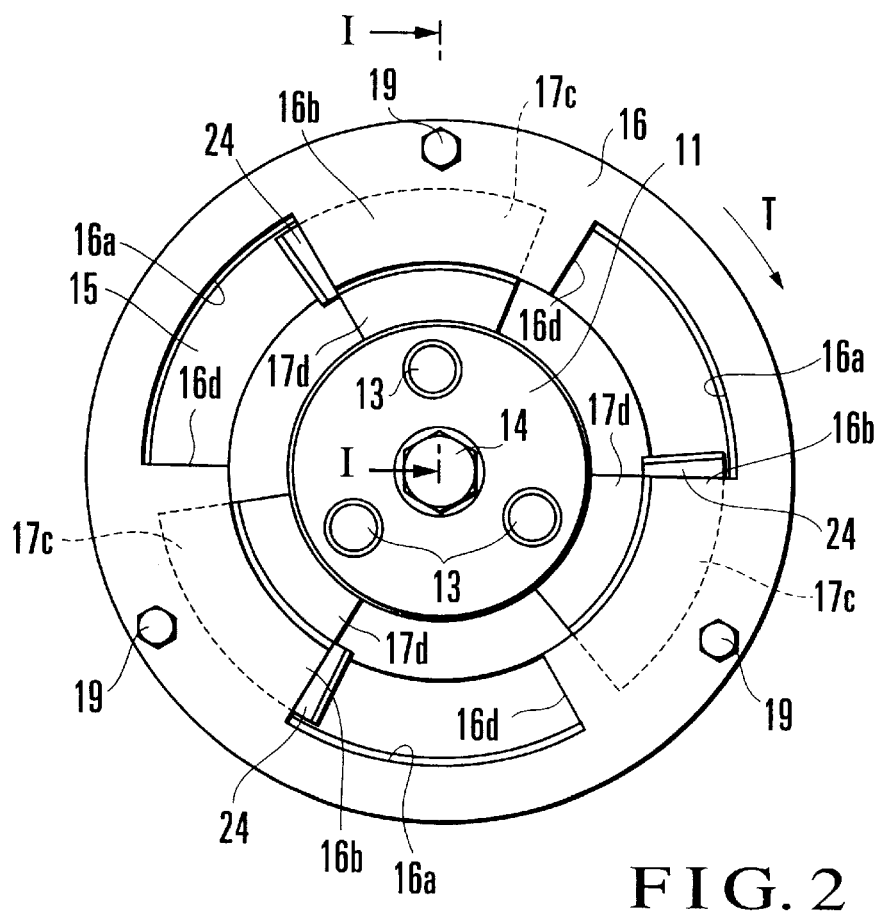
FIG. 2 is a front view of this apparatus.
Figure 3:
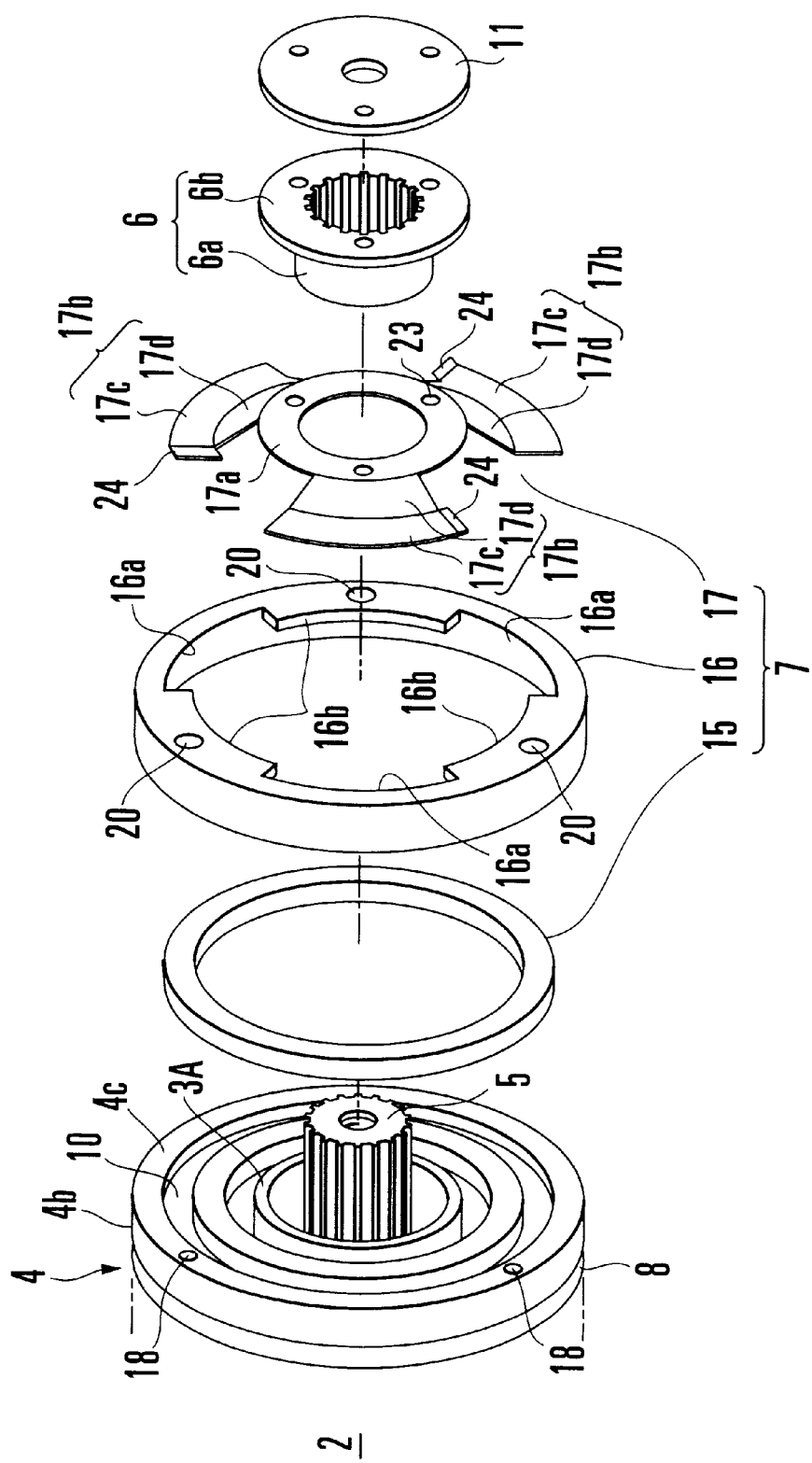
FIG. 3 is an exploded perspective view of the torque limiter mechanism.
Figure 4:
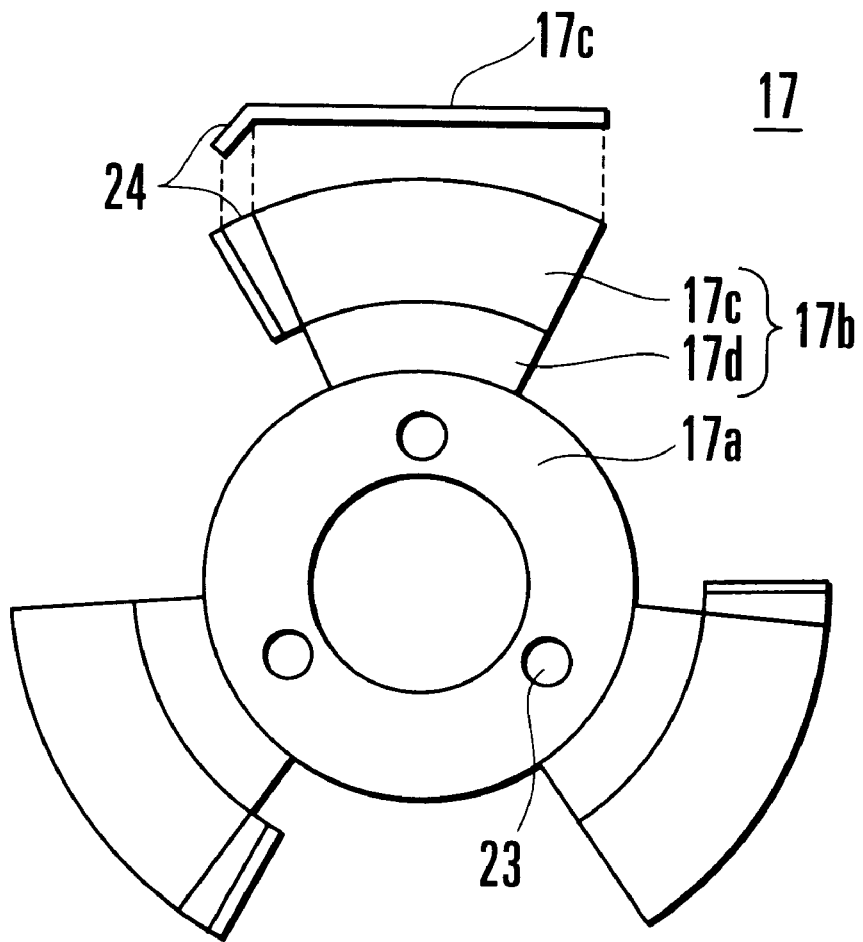
FIG. 4 is a plan view of an elastic member.
Figure 5:
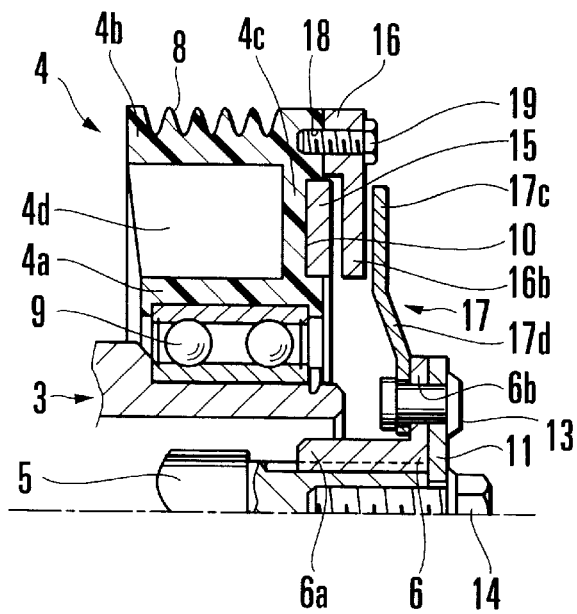
FIG. 5 is a sectional view, taken along the line V—V of FIG. 6, of the power transmission apparatus when it is disconnected from the torque limiter mechanism.
Figure 6:
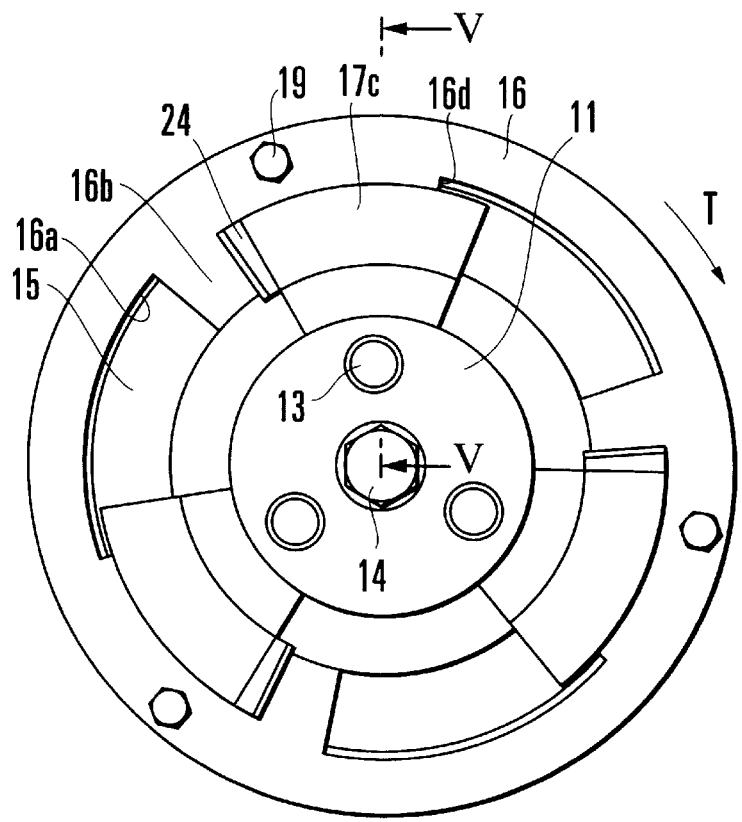
FIG. 6 is a front view of the apparatus when it is disconnected from the torque limiter mechanism.

FIGS. 1 to 6 show the first embodiment obtained by applying the present invention to a compressor for an automobile air conditioner, in which FIG. 1 shows a section, taken along the line I—I of FIG. 2, of a power transmission apparatus when it is connected to a torque limiter mechanism, FIG. 2 shows the front side of this apparatus, FIG. 3 shows a torque limiter mechanism, FIG. 4 shows an elastic member, FIG. 5 shows a section, taken along the line V—V of FIG. 6, of the power transmission apparatus when it is disconnected from the torque limiter mechanism, and FIG. 6 shows the front side of the apparatus when it is disconnected from the torque limiter mechanism.

Referring to FIGS. 1 to 6, a power transmission apparatus 1 has a pulley (driving rotary member) 4, hub (driven rotary member) 6, and torque limiter mechanism 7. The pulley 4 is rotatably mounted on a housing 3 of a compressor 2 for an automobile air conditioner as a driven device. The hub 6 is mounted on a rotating shaft 5 of the compressor 2. The torque limiter mechanism 7 connects the pulley 4 and hub 6 to each other.

The pulley 4 forms a cylinder comprised of an inner cylindrical portion 4a, an outer cylindrical portion 4b having a pulley groove 8 formed in its outer surface, and a disc plate 4c connecting one end of the inner cylindrical portion 4a and one end of the outer cylindrical portion 4b to each other. The pulley 4 is rotatably attached to the outer surface of a cylindrical projection 3A of the housing 3 through bearings 9. An annular housing recess 10 is formed in the surface of the disc plate 4c. The pulley 4 of this embodiment is a synthetic resin pulley formed by loading the bearings 9 in a mold and casting a molten synthetic resin material in the mold. The pulley 4 is integrally formed with a reinforcing rib 4d.

The hub 6 integrally has a boss 6a spline-fitted to the shaft end of the rotating shaft 5, and a circular disc-like flange 6b extending radially from the boss 6a. The flange 6b is fixed to an abutting plate 11, together with an elastic member 17 (to be described later), with a plurality of rivets 13. The abutting plate 11 is fixed with a bolt 14 to a projecting end face of the rotating shaft 5 projecting from the projection 3A.

The torque limiter mechanism 7 is comprised of three members, i.e., a friction member 15, a holding plate 16, and the elastic member 17. The friction member 15 is formed of, e.g., an elastic material having a large a static frictional torque, to have a ring-like shape, and is fitted in the housing recess 10 of the pulley 4. Since the friction member 15 has a thickness slightly larger than the depth of the housing recess 10, its surface (frictional surface) slightly projects from the surface of the disc plate 4c of the pulley 4. Screw holes 18 are formed at three equiangular positions of the surface of the disc plate 4c radially outside the housing recess 10. Bolts 19 threadably engaged in the screw holes 18 fix the holding plate 16 to the disc plate 4c of the pulley 4.

The holding plate 16 is formed by punching with a pressing machine into a circular disc, as shown in FIGS. 2 and 3. The holding plate 16 has bolt holes 20, where the bolts 19 are to be inserted, on its side closer to the outer periphery, and three arcuate recesses 16a in its inner periphery equidistantly in the circumferential direction. Portions among the adjacent recesses 16a form holding portions 16b for sandwiching connecting portions 17c (to be described later) of the elastic member 17 together with the friction member 15. The holding portions 16b are thinner than the outer peripheral portion of the holding plate 16 fixed to the pulley 4 with the bolts 19, so that the rear surface of the holding plate 16 opposes the friction member 15 with a necessary gap.

As shown in FIGS. 3 and 4, the elastic member 17 integrally has an annular base 17a and fan-like elastic deflectable portions (connecting portions) 17b extending radially outward from positions that equally divide the circumference of the annular base 17a into three portions. The annular base 17a is fixed to the abutting plate 11, together with the hub 6, with the three rivets 13. For this purpose, three rivet holes 23 are formed in the annular base 17a equidistantly in the circumferential direction.

Each connecting portion 17b is constituted by the corresponding arcuate connecting portion 17c sandwiched by the friction member 15 and the corresponding holding portion 16b of the holding plate 16, and an elastic support 17d that connects the connecting portion 17c and annular base 17a to each other. Of the edges of the connecting portion 17c in the circumferential direction, an edge opposite to the rotational direction (a direction of an arrow T in FIG. 2) of the pulley 4 is bent toward the surface side (a direction to separate from the friction member 15) at an appropriate angle to form a bent portion 24. When an overload is applied to the rotating shaft 5, the bent portion 24 serves to make the corresponding connecting portion 17c pass from a portion between the friction member 15 and the holding portion 16b of the holding plate 16 to disengage in the axial direction (outer side of the holding plate 16) through the recesses 16a (this will be described later). The elastic support 17d is bent toward the pulley 4 at a required angle, so that the connecting portion 17c closely opposes the holding plate 16 in a natural state, as shown in FIGS. 3 and 5.

To attach the power transmission apparatus 1 having the above structure, first, the bearings 9 are fitted on the projection 3A of the housing 3 with a snap ring so as not to disengage from it, so that the pulley 4 is rotatably attached to the projection 3A. The hub 6, to which the abutting plate 11 and elastic member 17 are fixed with the rivets 13, is spline-fitted to the rotating shaft 5, and the abutting plate 11 is fixed to the rotating shaft 5 with the bolt 14. Furthermore, the connecting portions 17c are brought into tight contact with the frictional surface of the friction member 15 while elastically deforming the elastic supports 17d of the elastic member 17 toward the pulley 4, and the holding portions 16b of the holding plate 16 are urged against the connecting portions 17c. The holding plate 16 is then fixed to the pulley 4 with the bolts 19. In this state, the bent portions 24 formed on the edges of the connecting portions 17c project from the edges opposite to the rotational direction of the holding portions 16b of the holding plate 16 that press the connecting portions 17c, as shown in FIG. 2.

In the power transmission apparatus 1 having the above structure, when a belt (not shown) is placed in the pulley groove 8 of the pulley 4, the pulley 4 is rotated by the power of the driving device, and rotation of the pulley 4 is transmitted to the hub 6 through the torque limiter mechanism 7. Accordingly, the rotating shaft 5 is also rotated to drive the compressor 2. In this embodiment, the transmission torque of the torque limiter mechanism 7 is set to about 80 Nm.

While power is transmitted by this torque limiter mechanism 7, even if the rotating shaft 5 is braked by an overload and stopped, the pulley 4 continues rotation. Thus, a slippage occurs among the connecting portions 17c of the elastic member 17, the friction member 15, and the holding portions 16b of the holding plate 16. Therefore, the connecting portions 17c move toward the recesses 16a of the holding plate 16 against the frictional coupling forces applied from both the friction member 15 and holding plate 16. When the connecting portions 17c move into the recesses 16a and are disengaged from the holding portions 16b, the elastic supports 17d are elastically restored to the initial state, so that the connecting portions 17c are disengaged toward the surface side of the holding plate 16, as shown in FIGS. 5 and 6. The elastic restoration force of the elastic supports 17d is preferably small enough not to make a large thrust load act on the bearings 9 and rotating shaft 5.

Upon occurrence of a slippage, when the connecting portions 17c of the elastic member 17 move into the recesses 16a, rotational direction-side end portions 16d (FIG. 2) of the holding portions 16b, each on a side opposite to the rotational direction of the recesses 16a, abut against the inclined rear surfaces of the bent portions 24 to spring the connecting portions 17c out of the recesses 16a, thereby forcibly disengaging the connecting portions 17c. As a result, the pulley 4 and hub 6 are disconnected from each other. As shown in FIG. 5, the connecting portions 17c of the elastic member 17 are displaced to the front side of the holding plate 16 by the elastic restoration of the elastic supports 17d and separated from the holding plate 16. Therefore, even if the pulley 4 continues rotation, a drag torque, sliding sound, frictional heat, or the like is not generated. Even if vibration should occur, it does not produce any noise unless the elastic member 17 and holding plate 16 are brought into contact with each other. In addition, the elastic member 17 is not broken when it is disconnected from the holding plate 16. When the holding plate 16 is removed from the pulley 4, the elastic supports 17d elastically deform toward the pulley 4, and the connecting portions 17c are sandwiched again by the friction member 15 and the holding portions 16b of the holding plate 16 to fix the holding plate 16 to the pulley 4, the original connection state can be restored. Therefore, no component must be exchanged, and the torque limiter mechanism 7 can be used as it is.

SECOND PREFERRED EMBODIMENT

Figure 7:
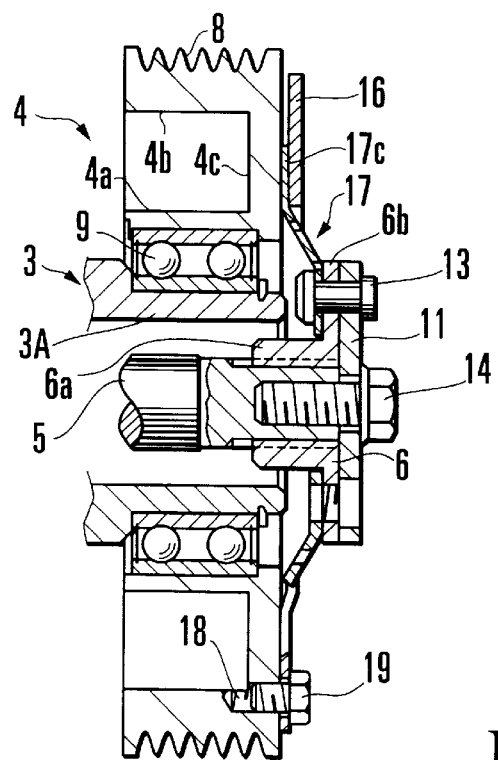
FIG. 7 is a sectional view taken along the line XIX—XIX of FIG. 8 to show the second embodiment of the present invention.
Figure 8:
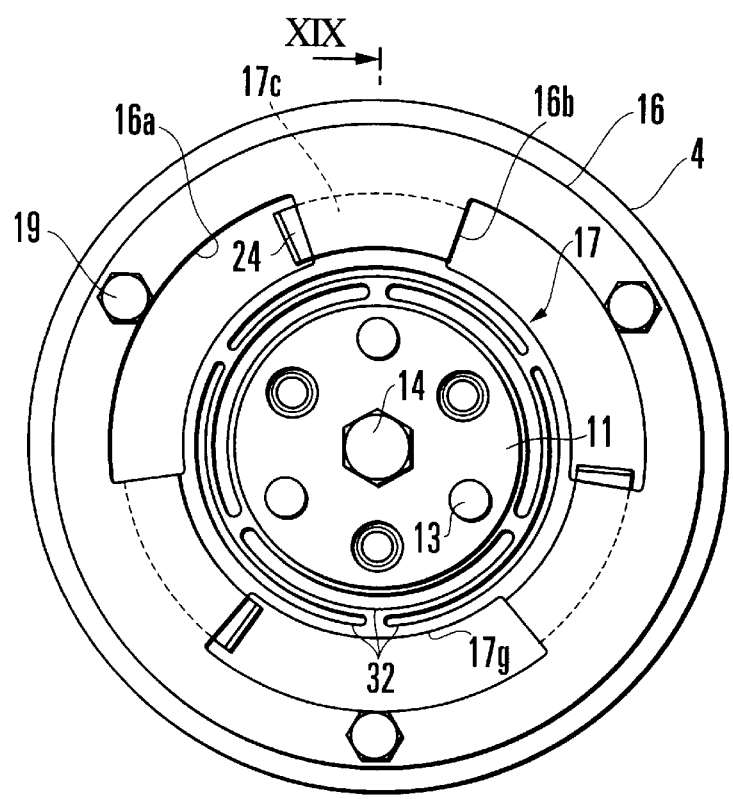
FIG. 8 is a front view of a power transmission apparatus.

FIGS. 7 and 8 show the second embodiment of the present invention, in which FIG. 7 shows a section taken along the line XIX—XIX of FIG. 8, and FIG. 8 shows the front side of a power transmission apparatus.

In this embodiment, a holding plate 16 is formed of a steel plate having spring properties to have a flat shape. The holding plate 16 sandwiches connecting portions 17c of an elastic member 17 together with a pulley 4. Three portions on the outer periphery of the holding plate 16 corresponding to the central portions, in the circumferential direction, of respective recesses 16a are fixed to the pulley 4 with bolts 19, in order to elastically deform holding portions 16b to a side opposite to the pulley 4 by an amount corresponding to the thickness of the connecting portions 17c. The connecting portions 17c are sandwiched by the pulley 4 and holding plate 16 with the restoration force of the holding portions 16b caused by this elastic deformation.

The elastic member 17 is composed of an annular elastic support 17g and the three equiangular connecting portions 17c projecting radially outward from the elastic support 17g.

A plurality of arcuate elongated holes 32 having different radii are formed in the elastic support 17g in the circumferential direction, so that the rigidity of the elastic support 17g can be decreased easily. A bent portion 24 is formed at the counter rotational direction-side edge of each connecting portion 17c. When the elastic support 17g elastically deforms in the direction of thickness, the connecting portions 17c are sandwiched by the surface of a disc plate 4c of the pulley 4 and the holding portions 16b of the holding plate 16.

This elastic member 17 is fabricated by punching carbon tool steel (SK material) having a thickness of about 0.8 mm with a pressing machine and forming the elongated holes 32 with a laser beam. The elastic member 17 is then hardened and tempered, and its entire surface is subjected to cationic electrodeposition and zinc coating to improve corrosion resistance and to prevent cohesion caused by rusting.

THIRD PREFERRED EMBODIMENT

Figure 9:
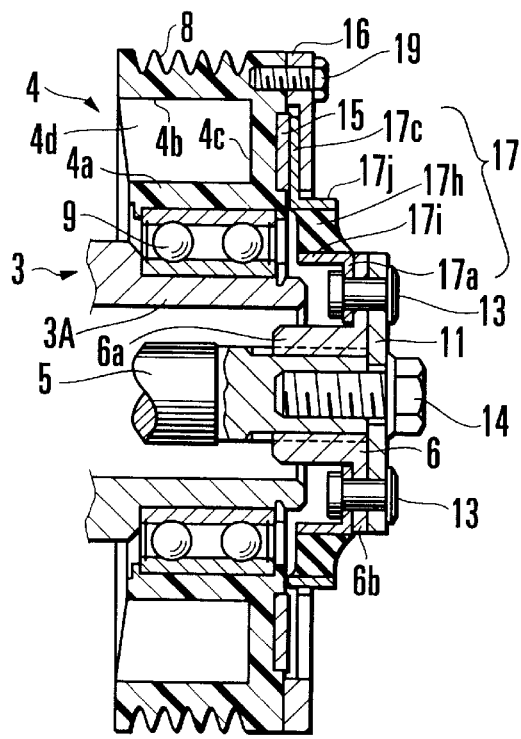
FIG. 9 is a sectional view taken along the line XXV—XXV of FIG. 10 to show the third embodiment of the present invention.
Figure 10:
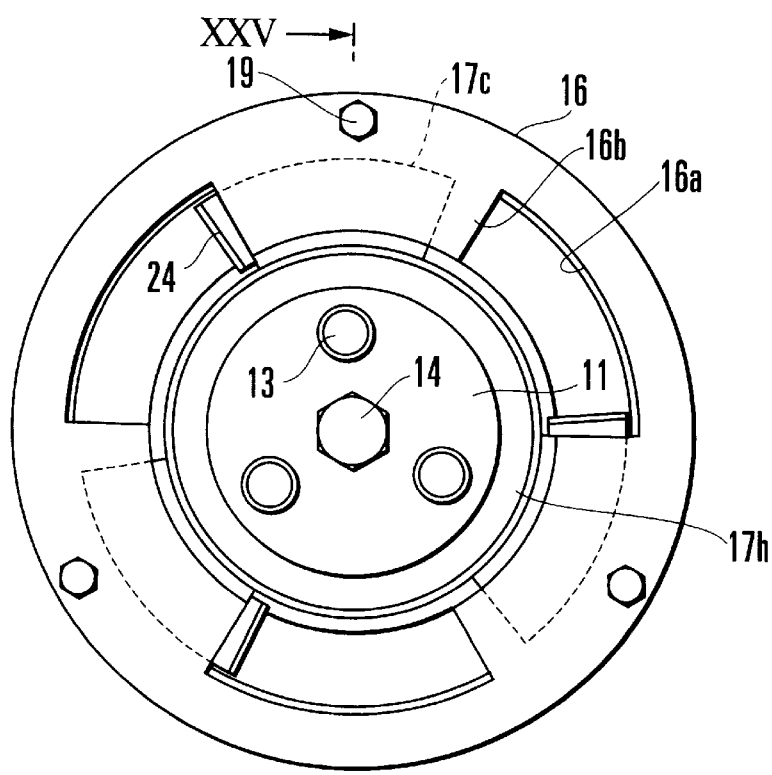
FIG. 10 is a front view of a power transmission apparatus.
Figure 11:
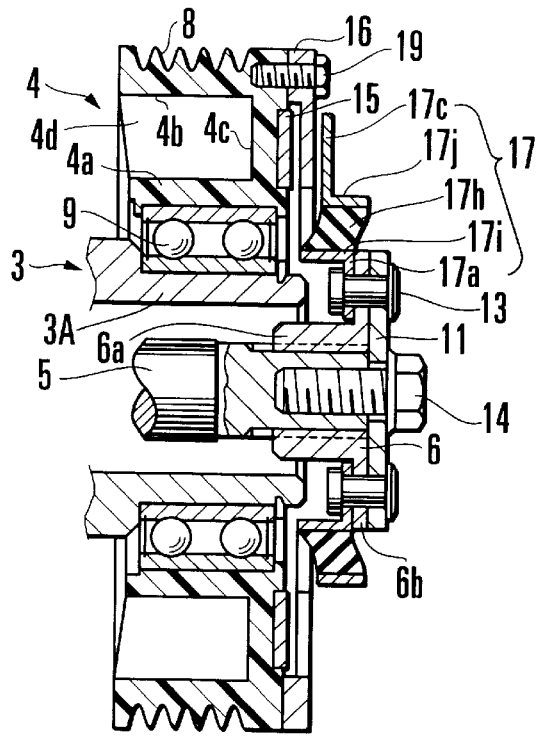
FIG. 11 is a sectional view taken along the line XXVII—XXVII of FIG. 12 when the apparatus is disconnected from a torque limiter mechanism.
Figure 12:
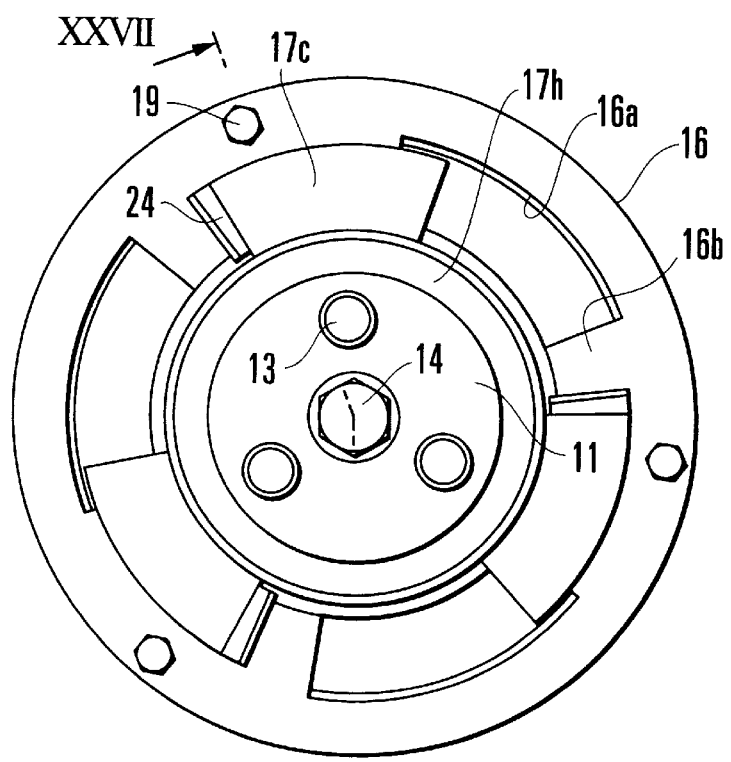
FIG. 12 is a front view of the apparatus when it is disconnected from the torque limiter mechanism.

FIGS. 9 to 12 show the third embodiment of the present invention, in which FIG. 9 shows a section taken along the line XXV—XXV of FIG. 10, FIG. 10 shows the front side of a power transmission apparatus, FIG. 11 shows a section taken along the line XXVII—XXVII of FIG. 12 when the apparatus is disconnected from a torque limiter mechanism, and FIG. 12 shows the front side of the apparatus when it is disconnected from the torque limiter mechanism.

In the third embodiment, a cylindrical portion 17i is integrally formed on the outer surface of an annular base 17a of an elastic member 17, and a cylindrical portion 17j surrounding the cylindrical portion 17i is integrally formed inside a connecting portions 17c. The cylindrical portions 17$i$ and 17$j$ are connected to each other with an elastic support 17$h$ made of rubber into a cylinder or ring. Except for this, the structure of the third embodiment is substantially the same as those of the first and second embodiments described above. In this structure as well, since the elastic member 17 has the elastic support 17$h$ made of rubber, the same effect as that of the eighth embodiment described above can be obtained.

FOURTH PREFERRED EMBODIMENT

Figure 13:
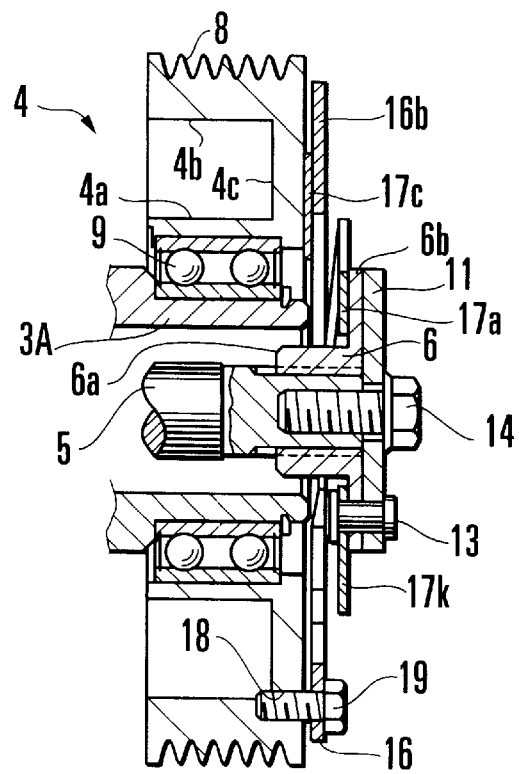
FIG. 13 is a sectional view taken along the line XXIX—XXIX of FIG. 14 to show the fourth embodiment of the present invention.
Figure 14:
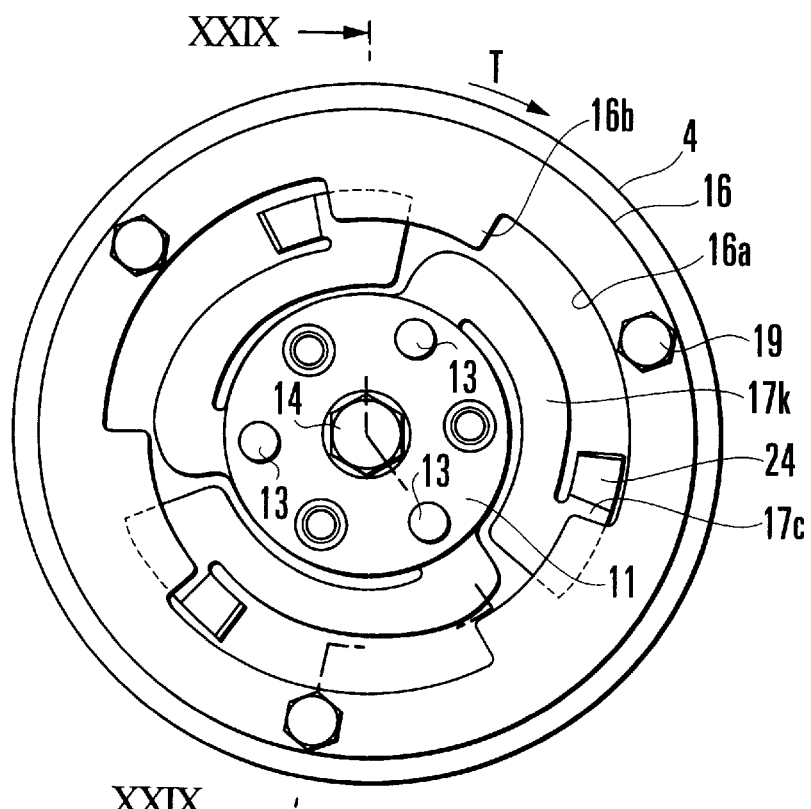
FIG. 14 is a front view of a power transmission apparatus.
Figure 15:
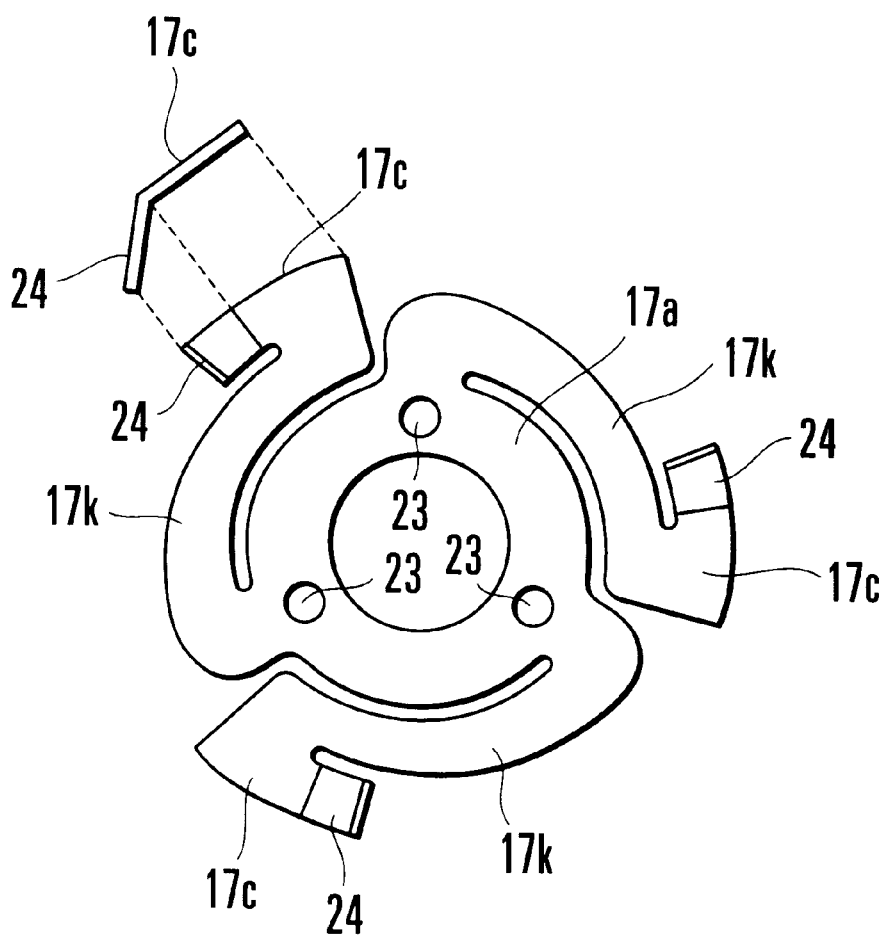
FIG. 15 is a front view of an elastic member.

FIGS. 13 to 15 show the fourth embodiment of the present invention, in which FIG. 13 shows a section taken along the line XXIX—XXIX of FIG. 14, FIG. 14 shows a power transmission apparatus, and FIG. 15 shows an elastic member.

In the fourth embodiment, a torque limiter mechanism 7 is comprised of two members, i.e., a holding plate 16 and elastic member 17. The elastic member 17 is comprised of an annular base 17$a$, three connecting portions 17$c$ each having a bent portion 24 on an end opposite to the rotational direction (T direction), and elastic supports 17$k$ connecting the annular base 17$a$ and the connecting portions 17$c$ to each other. Each elastic support 17$k$ is formed into an arc to surround substantially ⅓ the outer circumference of the annular base 17$a$ so that it can be deflected easily, and is formed with the connecting portion 17$c$ at its distal end. The connecting portion 17$c$ extends radially from the distal end of each elastic support 17$k$ to be located outside it, and is formed with the bent portion 24 at its distal end. The holding plate 16 is formed flat in the same manner as in the second embodiment, and is fixed to a pulley 4 with bolts 19, to sandwich the connecting portions 17$c$ of the elastic member 17 together with the pulley 4.

With this structure, the power transmission apparatus can be mounted on the compressor easily.

FIFTH PREFERRED EMBODIMENT

Figure 16:
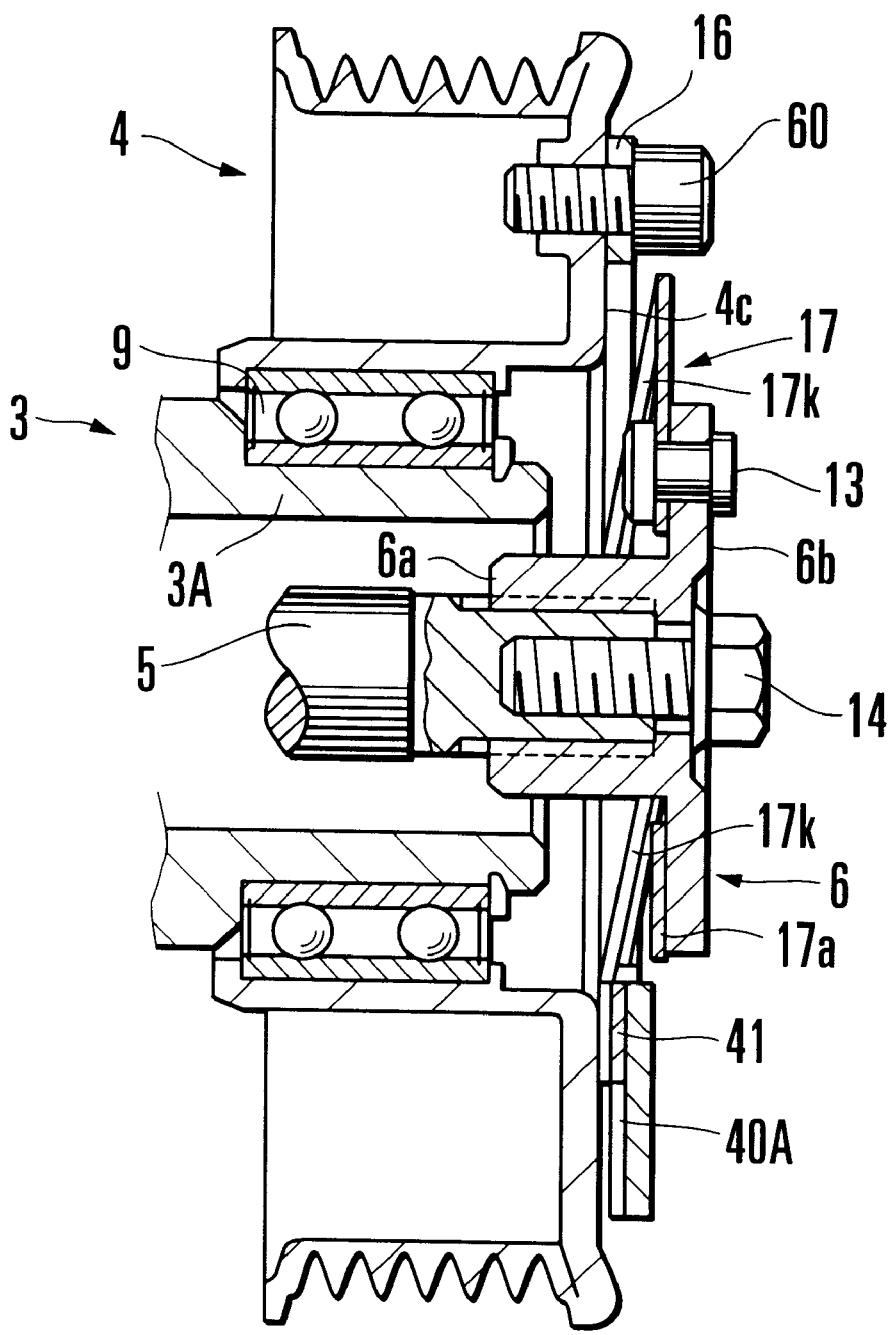
FIG. 16 is a sectional view taken along the line XXIV—XXIV of FIG. 17 to show the fifth embodiment of the present invention.
Figure 17:
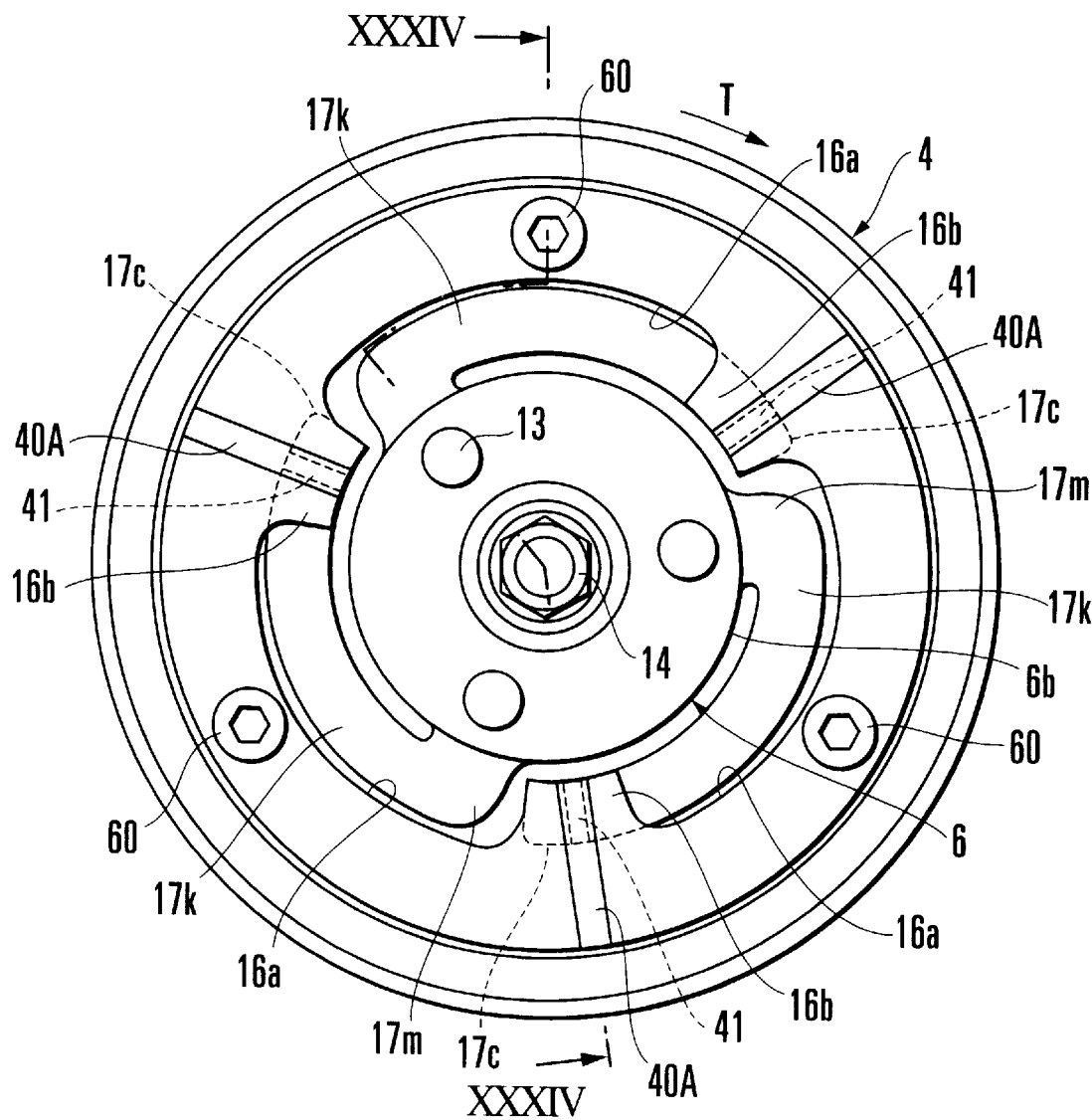
FIG. 17 is a front view of a power transmission apparatus.

FIGS. 16 and 17 show the fifth embodiment of the present invention, in which FIG. 16 shows a section taken along the line XXIV—XXIV of FIG. 17, and FIG. 17 shows a power transmission apparatus.

In this embodiment, a pulley 4 is fabricated by sheet metal working. A hub 6 is fabricated from a steel material made of carbon steel for a machine structure. The hub 6 is threadably engaged on a rotating shaft 5 and fixed with a bolt 14.

A holding plate 16 is formed of a steel plate made of hardened and tempered carbon tool steel and having a thickness of about 1.6 mm to 2.0 mm to have a circular plate-like shape. Three recesses 16$a$ and three holding portions 16$b$ are alternately formed on the inner periphery of the holding plate 16, and the holding plate 16 is fixed to a disc plate 4$c$ of the pulley 4 with three hexagon socket head cap screws 60. The circumferential length of each holding portion 16$b$ is sufficiently shorter than that of the recess 16$a$. A locking portion 40A for locking an elastic member 17 is formed on that surface of the holding plate 16 which opposes the pulley 4. The locking portion 40A is a semicircular recess and formed radially to extend from the outer surface of the corresponding holding portion 16$b$ to the distal end thereof.

The elastic member 17 is formed of a steel plate made of hardened and tempered carbon tool steel and having a thickness of about 0.8 mm to 1.0 mm to form a circular plate. The elastic member 17 is comprised of an annular base 17$a$, three connecting portions 17$c$ located outside the annular base 17$a$ equidistantly in the circumferential direction, and three elastic supports 17$k$ for connecting the connecting portions 17$c$ and annular base 17$a$ to each other. The annular base 17$a$ is fixed to the lower surface of a flange 6$b$ of the hub 6 with three rivets 13. The elastic supports 17$k$ are formed into arcs to surround the annular base 17$a$, and their counter rotational direction-side ends are bent toward the center of the annular base 17$a$ to form connecting portions 17$m$ to be connected to the annular base 17$a$. The connecting portions 17$c$ extend from the rotational direction-side ends of the elastic supports 17$k$, and are formed into arcs to have the same radius as that of the elastic supports 17$k$. The connecting portions 17$c$ are urged against the disc plate 4$c$ of the pulley 4 by the holding portions 16$b$ of the holding plate 16. In this state, the elastic supports 17$k$ deflect toward the pulley 4 about the connecting portions 17$m$ as the fulcrums, and are located in the corresponding recesses 16$a$ of the holding plate 16. Note that the connecting portions 17$m$ are located substantially on the same plane as the annular base 17$a$ and in front of the surfaces of the holding portions 16$b$.

Engaging portions 41 to engage with the locking portions 40A of the holding portions 16$b$ are formed on the surfaces of the connecting portions 17$c$, respectively. Each engaging portion 41 is comprised of a semicylindrical projection elongated in the radial direction of the elastic member 17. The engaging portions 41 usually engage with the locking portions 40A to transmit rotation of the pulley 4 to the hub 6 through the elastic member 17.

The entire surfaces of the pulley 4, hub 6, holding plate 16, and elastic member 17 are subjected to cationic electrodeposition and zinc coating to improve corrosion resistance and to prevent adhesion caused by rusting.

In the power transmission apparatus having the above structure, assume that the rotating shaft 5 is braked by an overload and stopped. Since the pulley 4 continues rotation, the locking portions 40A and engaging portions 41 are disengaged from each other, and the elastic supports 17$k$ are elastically restored, so that the connecting portions 17$c$ disengage toward the surface of the holding plate 16. Even if the elastic restoration force of the elastic supports 17$k$ is small and the connecting portions 17$c$ do not quickly disengage from the holding plate 16, the holding portions 16$b$ of the holding plate 16 move into the lower sides of the connecting portions 17$m$ to forcibly push out the elastic supports 17$k$ and connecting portions 17$c$ from the recesses 16$a$. Therefore, the pulley 4 and hub 6 which have been connected to each other by the torque limiter mechanism can reliably be disconnected from each other.

In this structure, engagement of the locking portions 40A and engaging portions 41 can increase the connecting force obtained by the torque limiter mechanism. Since the connecting portions 17$c$ and elastic supports 17$k$ of the elastic member 17 are located on the same circumference as the holding portions 16$b$ of the holding plate 16, the shape of the elastic member 17 is simplified when compared to the fourth embodiment shown in FIGS. 13 to 15. The elastic member 17 can be manufactured easily and can have a smaller radius. The yield of the material can also be improved. The connecting portions 17$c$ need not be formed with any bent portions.

SIXTH PREFERRED EMBODIMENT

Figure 18:
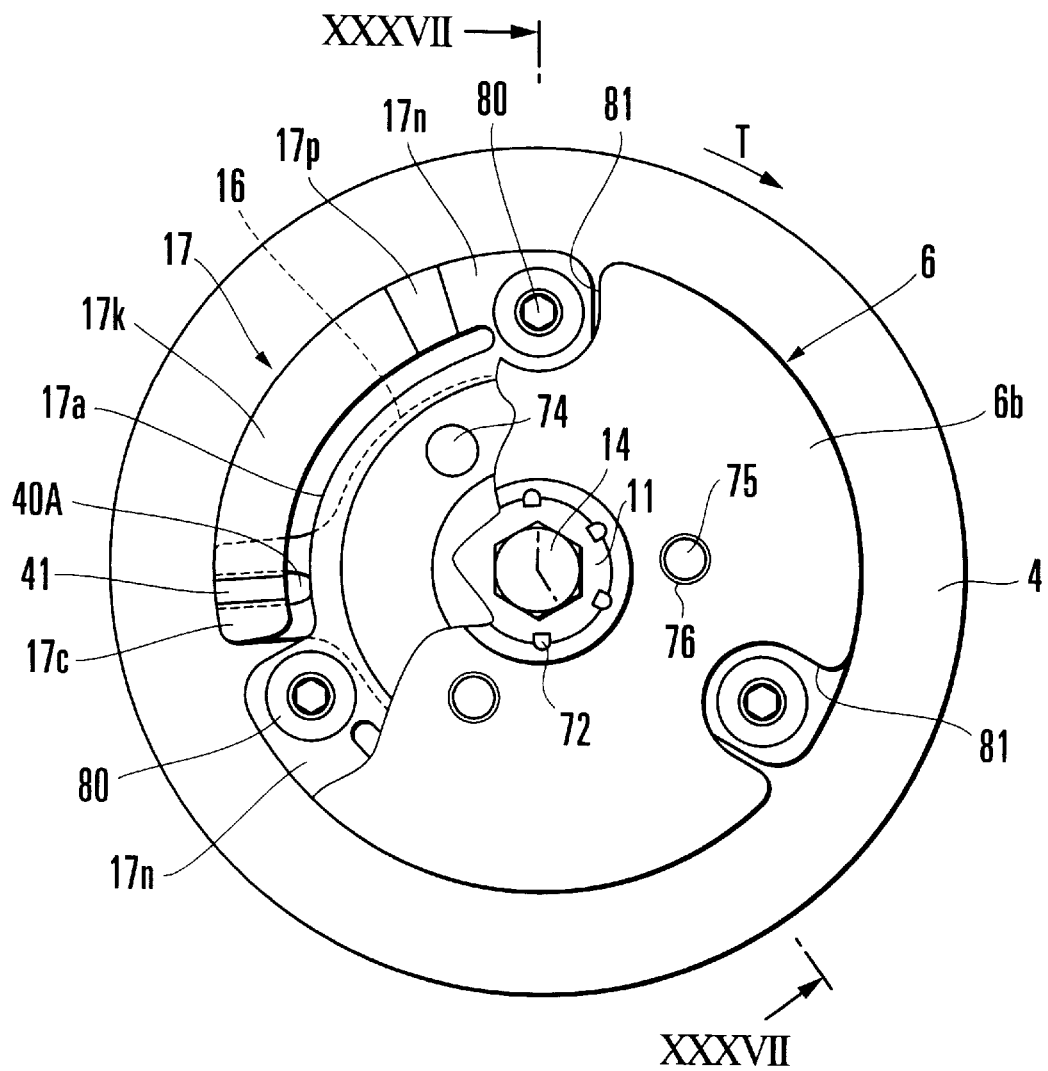
FIG. 18 is a partially cutaway front view of a power transmission apparatus according to the sixth embodiment of the present invention.
Figure 19:
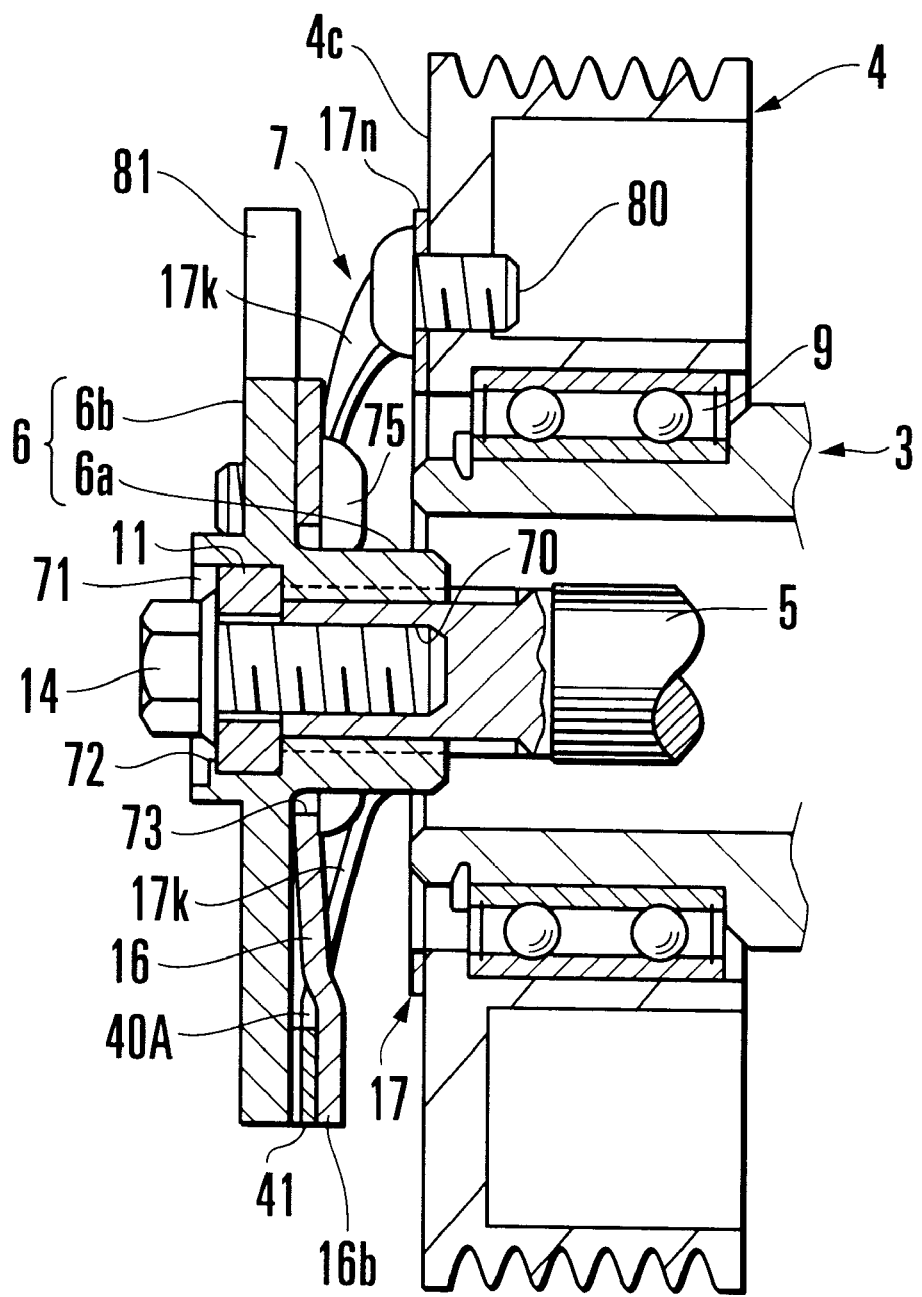
FIG. 19 is a sectional view taken along the line XXXVII—XXXVII of FIG. 18.
Figures 20A, 20B:
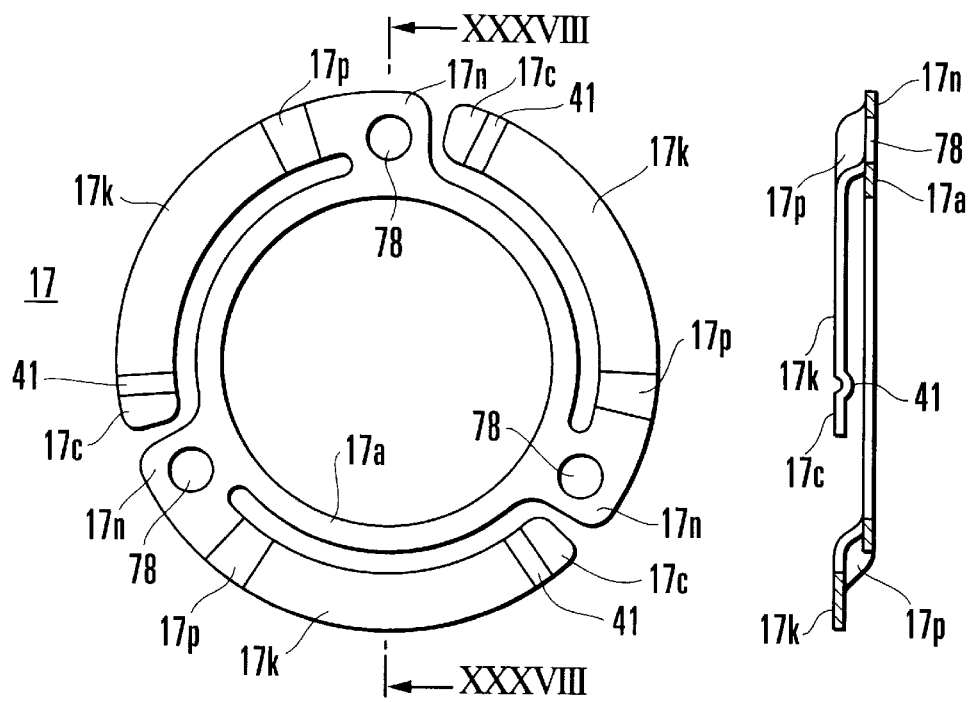
FIG. 20A is a plan view of an elastic member.
FIG. 20B is a sectional view taken along the line XXXVIII—XXXVIII of FIG. 20A.
Figure 21C:
FIG. 21C is a side view of a holding portion of the holding plate.
Figures 21A, 21B:
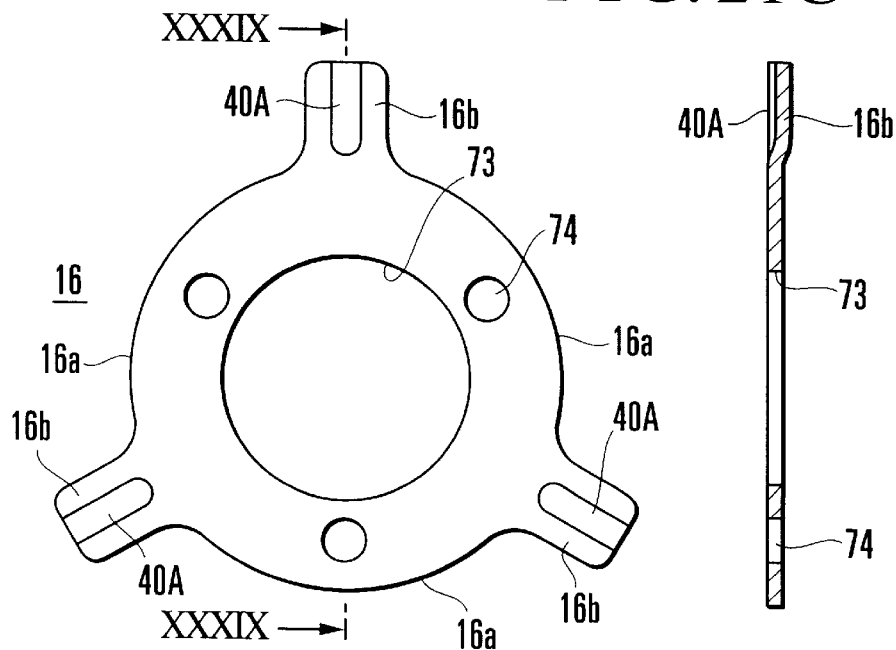
FIG. 21A is a plan view of a holding plate.
FIG. 21B is a sectional view taken along the line XXXIX—XXXIX of FIG. 21A.

FIGS. 18 to 21C show the sixth embodiment of the present invention, in which FIG. 18 shows a power transmission apparatus, FIG. 19 shows a section taken along the line XXXVII—XXXVII of FIG. 18, FIG. 20A shows an elastic member, FIG. 20B shows a section taken along the line XXXVIII—XXXVIII of FIG. 20A, FIG. 21A shows a holding plate, FIG. 21B shows a section taken along the line XXXIX—XXXIX of FIG. 21A, and FIG. 21C shows a holding portion of the holding plate.

In this embodiment, a torque limiter mechanism 7 is constituted by two members, i.e., a holding plate 16 and elastic member 17. The holding plate 16 is fixed to a hub 6 serving as a driven rotary member. The elastic member 17 is fixed to a pulley 4 serving as a driving rotary member. Connecting portions 17c of the elastic member 17 are sandwiched by the hub 6 and holding plate 16. The pulley 4 is fabricated from a steel material in the same manner as the hub 6.

The hub 6 integrally has a boss 6a and flange 6b. The boss 6a is spline-fitted to a rotating shaft 5, and a bolt 14 is screwed into a screw hole 70 formed in the distal end face of the rotating shaft 5 through an abutting plate 11, thereby fixing the hub 6 to the rotating shaft 5. The abutting plate 11 is fitted in a fitting recess 71 formed at the center of the surface of the flange 6b. The circumferential wall portion of the fitting recess 71 is caulked at a plurality of portions, so that the abutting plate 11 will not remove from the fitting recess 71. Reference numeral 72 denotes a caulking portion.

The holding plate 16 is formed from a metal plate by pressing or the like into a circular disc as shown in FIG. 21A. The holding plate 16 has a center hole 73 where the boss 6a of the hub 6 is to extend, and three screw attaching holes 74 formed around the center hole 73. Three equiangular holding portions 16b radially project from the outer surface of the holding plate 16. Arcuate spaces each surrounded by the two adjacent holding portions 16b and the outer surface of the holding plate 16 form recesses 16a. A locking portions 40A comprised of a semicircular groove is formed in each holding portion 16b, i.e., at the center in the widthwise direction of that surface of each holding portion 16b which is opposite to the pulley 4, in the radial direction of the holding plate 16. The screw attaching holes 74 are formed equidistantly in the circumferential direction so that each of them is located between the two adjacent holding portions 16b. This holding plate 16 is fitted on the boss 6a such that its surface formed with the locking portions 40A comes into tight contact with the lower surface of the flange 6b of the hub 6. Set screws 75 are inserted in the screw attaching holes 74 and screwed into screw holes 76 formed in the flange 6b, so that the holding plate 16 is fixed to the lower surface of the flange 6b.

As shown in FIG. 20A, the elastic member 17 is comprised of an annular base 17a, three connecting portions 17c located outside the annular base 17a equidistantly in the circumferential direction, and three elastic supports 17k for connecting the connecting portions 17c and annular base 17a to each other. The elastic supports 17k are formed into arcs to surround the annular base 17a. Rotational direction-side ends of the elastic supports 17k are connected to the outer surface of the annular base 17a through connecting portions 17n, and the connecting portions 17c extend from counter rotational direction-side ends of the elastic supports 17k. The connecting portions 17c are formed into arcs to have the same radius as that of the elastic supports 17k, to form a surface on the same plane as that of the elastic supports 17k. Engaging portions 41 formed of semicircular cylindrical projections are formed on the lower surfaces of the connecting portions 17c throughout the entire widths of the connecting portions 17c to engage with the corresponding locking portions 40A of the holding plate 16. The connecting portions 17n form a surface flush with that of the annular base 17a, and are respectively formed with screw attaching holes 78. Bent portions 17p are formed at the boundaries of the connecting portions 17n and elastic supports 17k. The bent portions 17p allow the connecting portions 17c and elastic supports 17k to be displaced in parallel in front of the annular base 17a in a natural state.

The elastic member 17 is attached to the hub 6 together with the holding plate 16 in advance so that the hub 6 and torque limiter mechanism 7 form a unit. When attaching the elastic member 17 to the hub 6, the connecting portions 17c are sandwiched by the flange 6b and holding portions 16b, and the engaging portions 41 are engaged with the locking portions 40A. In this state, the holding plate 16 is fixed to the flange 6b with the set screws 75, so that the three components consisting of the hub 6, holding plate 16, and elastic member 17 form a unit. Subsequently, the boss 6a of the hub 6 is spline-fitted to the rotating shaft 5 and is fixed with the bolt 14. The elastic supports 17k deflect toward the pulley 4, and the connecting portions 17n are fixed to the surface of a disc plate 4c of the pulley 4 with set screws 80, thereby connecting the pulley 4 and hub 6 to each other. Recesses 81 are formed in the outer periphery of the flange 6b of the hub 6 to allow the set screws 80 to be screwed and unscrewed easily.

In this structure, when the rotating shaft 5 is braked and stopped by an overload, the locking portions 40A and engaging portions 41 are disengaged from each other, so that the connecting portions 17c are disengaged from portions between the flange 6b and holding portions 16b. The elastic supports 17k are accordingly elastically restored to disconnect the pulley 4 from the hub 6.

In this power transmission apparatus, the boundaries between the elastic supports 17k and connecting portions 17n of the elastic member 17 are bent, and steps are formed among the annular base 17a, elastic supports 17k, and connecting portions 17c. Therefore, stresses acting on that portion of the elastic member 17 through which the elastic member 17 is attached to the pulley 4, and on the connecting portions 17c sandwiched by the hub 6 and holding plate 16 can be reduced.

SEVENTH PREFERRED EMBODIMENT

Figure 22:
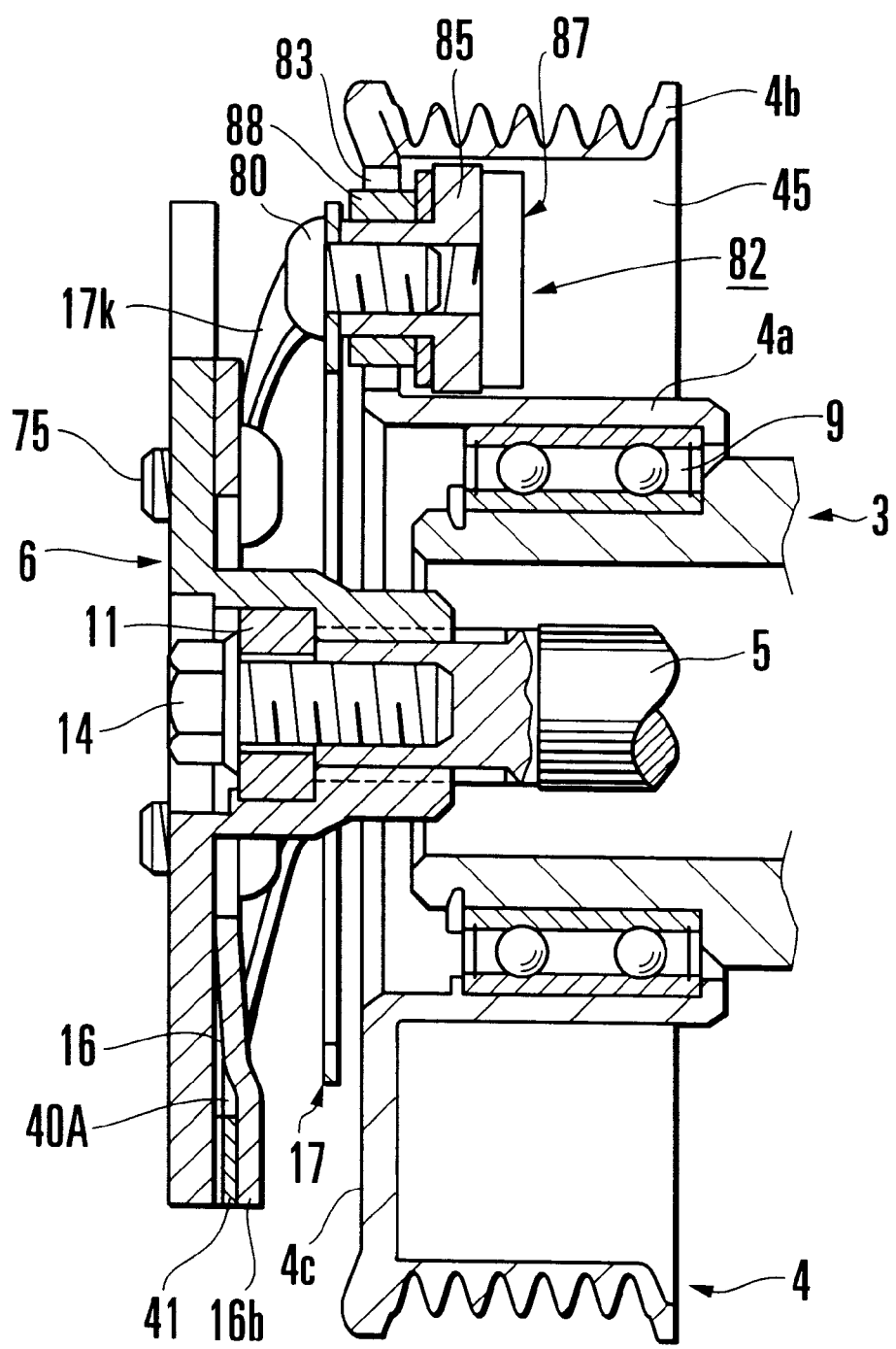
FIG. 22 is a sectional view of a power transmission apparatus according to the seventh embodiment of the present invention.
Figure 23:
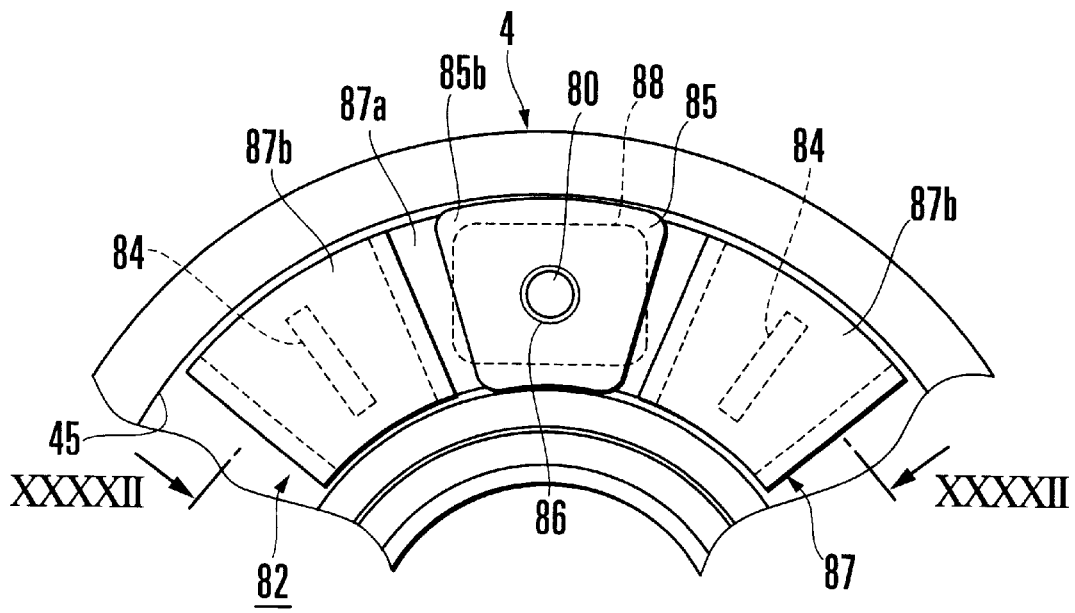
FIG. 23 is a rear view of the main part of a pulley.
Figure 24:
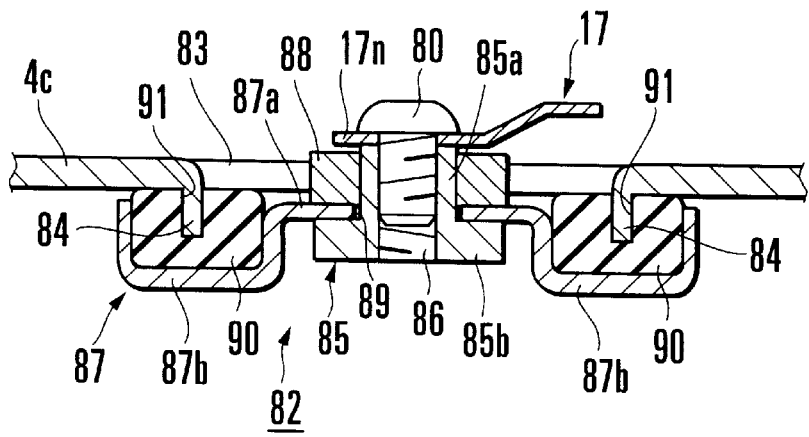
FIG. 24 is a sectional view taken along the line XXXXII—XXXXII of FIG. 23.

FIGS. 22 to 24 show the seventh embodiment of the present invention, in which FIG. 22 shows a section of a power transmission apparatus, FIG. 23 shows the main part of a pulley, and FIG. 24 shows a section taken along the line XXXXII—XXXXII of FIG. 23.

This embodiment is different from the sixth embodiment described above in that a pulley 4 is made of a sheet metal and connecting portions 17n of an elastic member 17 are connected to the pulley 4 through a damper mechanism 82. Except for these, the structure of the seventh embodiment is substantially the same as that of the sixth embodiment.

Three arcuate openings 83 are formed in a disc plate 4c of the pulley 4 equidistantly in the circumferential direction to be elongated in the circumferential direction. The two side edges in the circumferential direction of each opening 83 are bent at substantially the right angle into an annular recess 45 of the pulley 4, to form locking portions 84 of the damper mechanism 82. The annular recess 45 is a space surrounded by an inner cylindrical portion 4a, an outer cylindrical portion 4b, and the disc plate 4c of the pulley 4, and opens to the rear side of the pulley 4.

The damper mechanism 82 has nuts 85 to which the connecting portions 17n of the elastic member 17 are fixed with set screws 80. Each nut 85 has a cylindrical main body 85a formed with a screw hole 86, and a trapezoidal flange 85b integrally formed on the outer surface, on the rear end side, of the main body 85a. The flange 85b is fitted in the annular recess 45 such that its rotation is prevented, and the main body 85a projects from the corresponding opening 83 toward the front side of the pulley 4. A rubber holder 87 and stationary ring 88 are fitted on the outer surface of the main body 85a, and the corresponding connecting portion 17n of the elastic member 17 is fixed to the distal end face of the main body 85a with the set screw 80.

The rubber holder 87 is formed by bending a sheet metal into an arcuate shape having a length sufficient for covering the opening 83, and is comprised of a central plate 87a and U-shaped rubber housing portions 87b formed on two ends of the central plate 87a by bending. The rubber holder 87 is fitted in the annular recess 45, and its central plate 87a is fitted on the main body 85a of the nut 85. For this purpose, a hole 89 through which the main body 85a extends is formed at the center of the central plate 87a. The rubber housing portions 87b open to a hub 6, and rubber dampers 90 are fitted in the rubber housing portions 87b. A groove 91 to engage with the locking portion 84 of the pulley 4 is formed at the center of the surface of each rubber damper 90. The structure of a holding plate 16 and that of the elastic member 17 are completely the same as those of the sixth embodiment described above.

In this structure, the elastic member 17 is connected to the pulley 4 through the damper mechanism 82. A load acting on the elastic member 17 when a power is transmitted to the pulley 4 can be effectively absorbed by the rubber dampers 90. Therefore, a stress acting on connecting portions 17c of the elastic member 17, sandwiched by the hub 6 and holding plate 16, due to an impact and torque variations during power transmission can be reduced, and the connecting portions 17c of the elastic member 17 will not easily remove from between the hub 6 and holding plate 16.

EIGHTH PREFERRED EMBODIMENT

Figure 25:
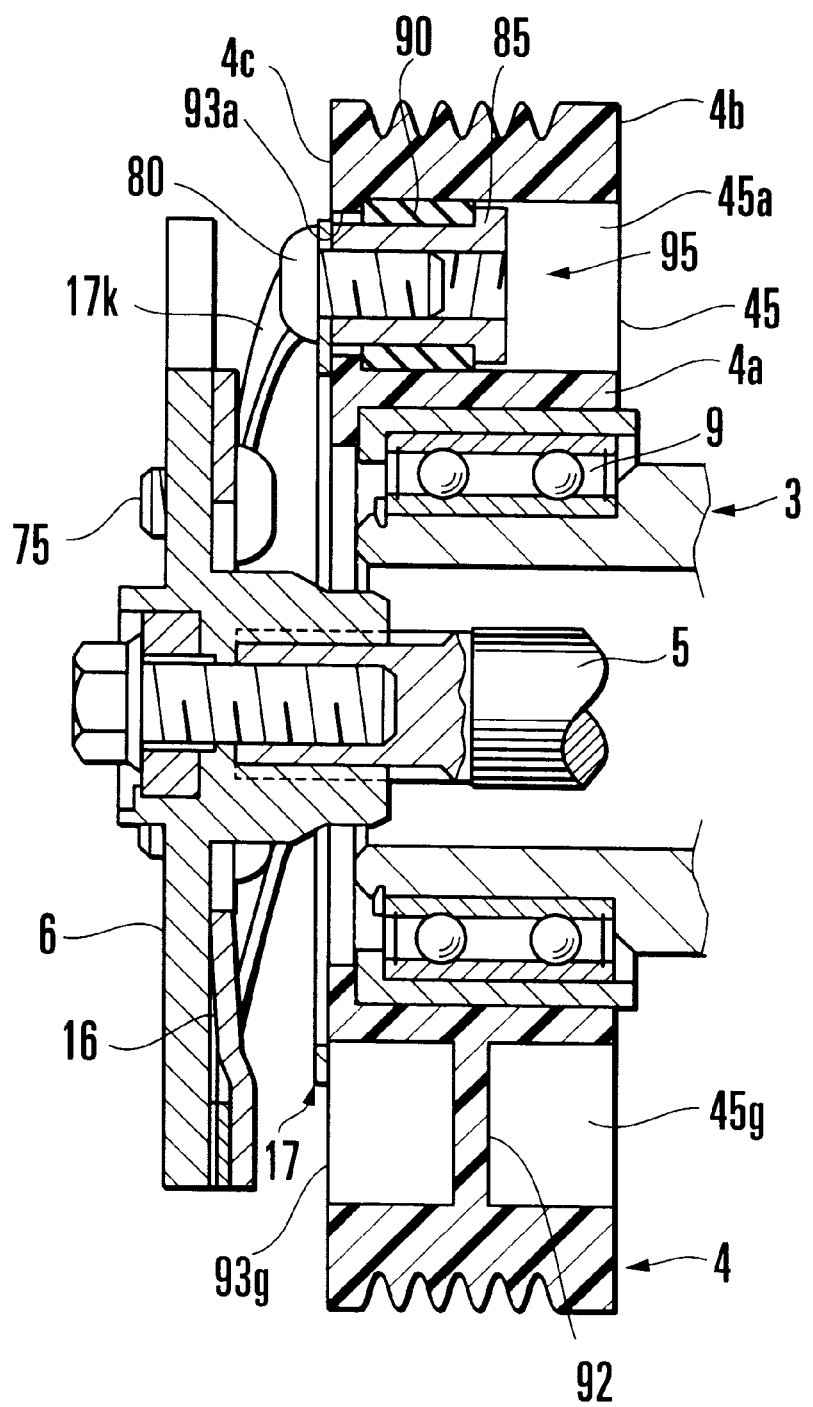
FIG. 25 is a sectional view of a power transmission apparatus according to the eighth embodiment of the present invention.
Figure 26:
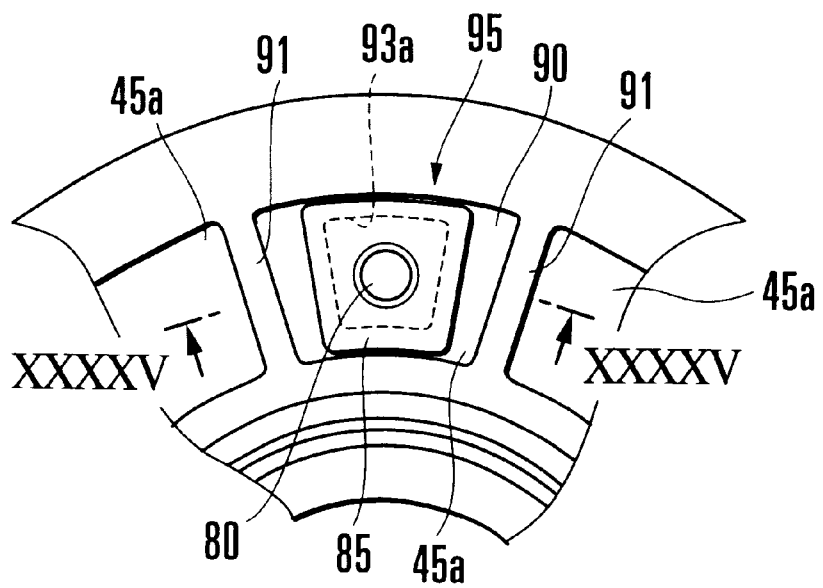
FIG. 26 is a rear view of the main part of a pulley.
Figure 27:
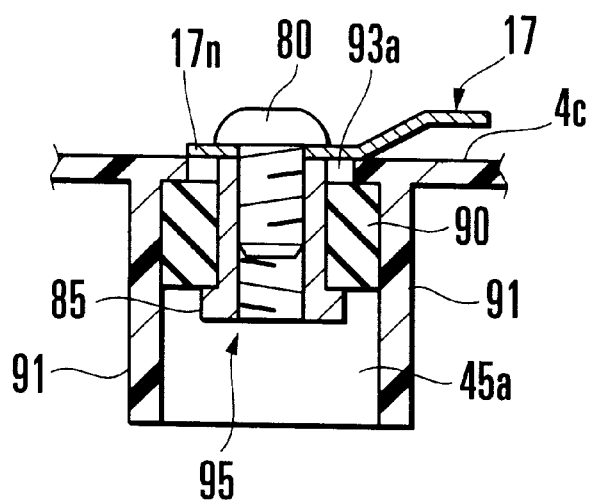
FIG. 27 is a sectional view taken along the line XXXXV—XXXXV of FIG. 26.

FIGS. 25 to 27 show the eighth embodiment of the present invention, in which FIG. 25 shows a power transmission apparatus, FIG. 26 shows the main part of a pulley, and FIG. 27 shows a section taken along the line XXXXV—XXXXV of FIG. 26.

This embodiment is different from the seventh embodiment described above in that a pulley 4 is fabricated from a synthetic resin and in the structure of damper mechanisms 95 which connect an elastic member 17 to a hub 6. Except for these, the structure of the eighth embodiment is completely the same as that of the seventh embodiment.

The pulley 4 has an inner cylindrical portion 4a, an outer cylindrical portion 4b, a disc plate 4c for connecting the cylindrical portions 4a and 4b to each other, radial ribs 91, and circumferential ribs 92. The radial ribs 91 are formed radially and equidistantly in the circumferential direction to divide an annular recess 45 between the inner and outer cylindrical portions 4a and 4b into twelve trapezoidal recesses 45a. The circumferential ribs 92 are formed at the centers of only the nine recesses 45a out of the twelve recesses 45a exclusive of the three recesses 45a that are distant from each other at 120°. Twelve holes 93a are formed in the disc plate 4c in the circumferential direction to correspond to the recesses 45a. Accordingly, the three recesses 45a form through holes extending through the pulley 4 in the axial direction, and the damper mechanisms 95 are incorporated in these recesses 45a. The three holes 93a in which the damper mechanisms 95 are incorporated are formed smaller than the recesses 45a so that the damper mechanism 95 will not remove from them.

Each damper mechanism 95 is comprised of a nut 85 and a rubber damper 90 formed on the surface of the nut 85. The nut 85 is formed to be the same as the nut 85 used in the seventh embodiment described above, and is located in the corresponding recess 45a. A corresponding connecting portion 17n of the elastic member 17 is fixed to the distal end face of the nut 85 with a set screw 80.

In this structure, since a rubber housing portion can be fabricated integrally with the pulley 4, the operation of incorporating the damper mechanisms 95 is easier than in the seventh embodiment described above, and the number of assembling steps can be reduced.

NINTH PREFERRED EMBODIMENT

Figure 28:
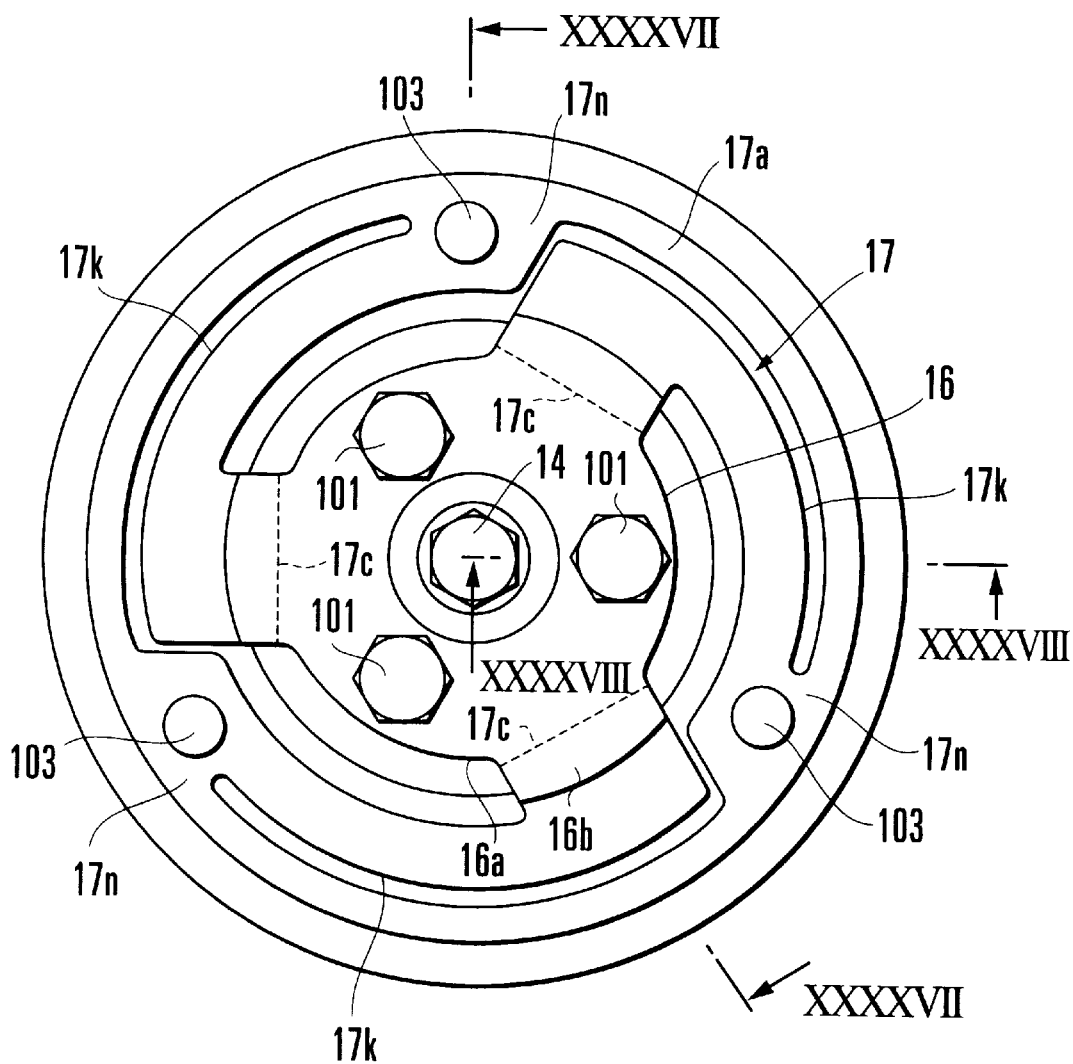
FIG. 28 is a front view of a power transmission apparatus according to the ninth embodiment of the present invention.
Figure 29:
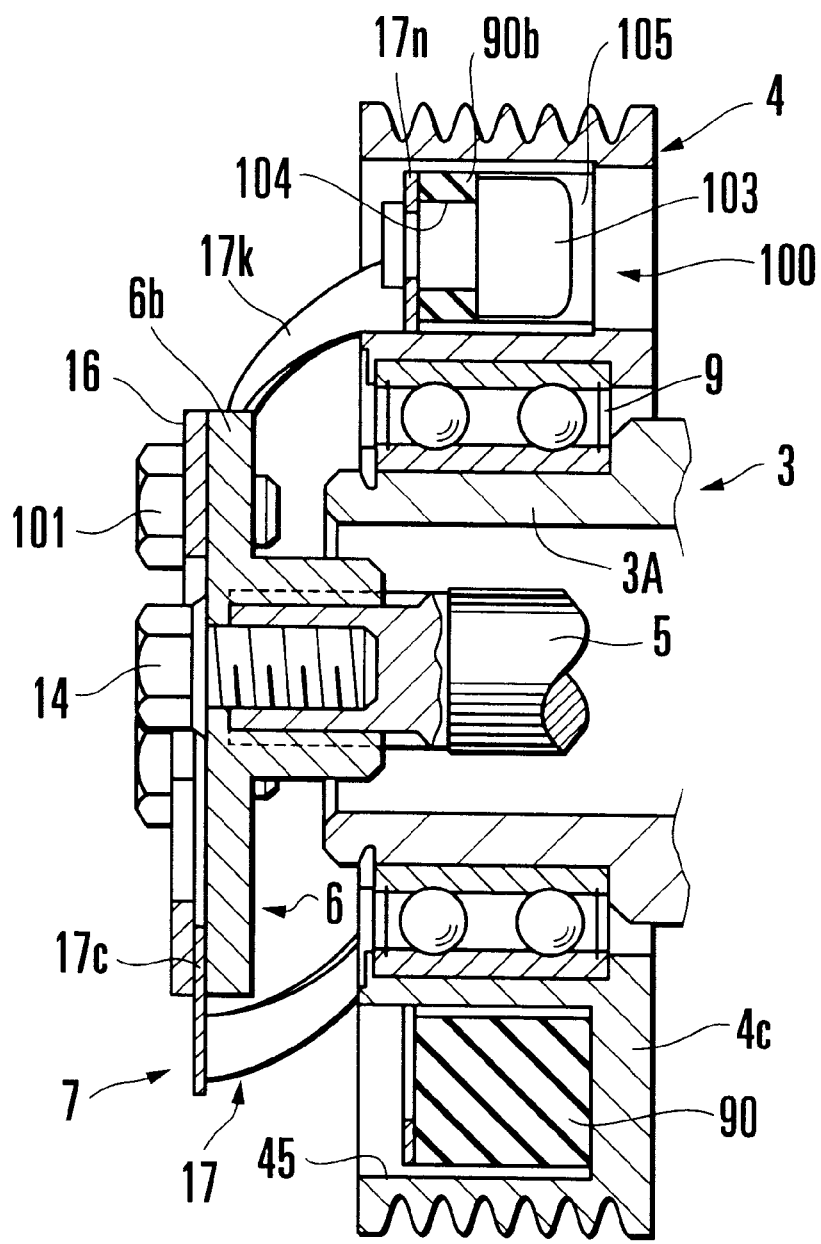
FIG. 29 is a sectional view taken along the line XXXXVII—XXXXVII of FIG. 28.
Figure 30:
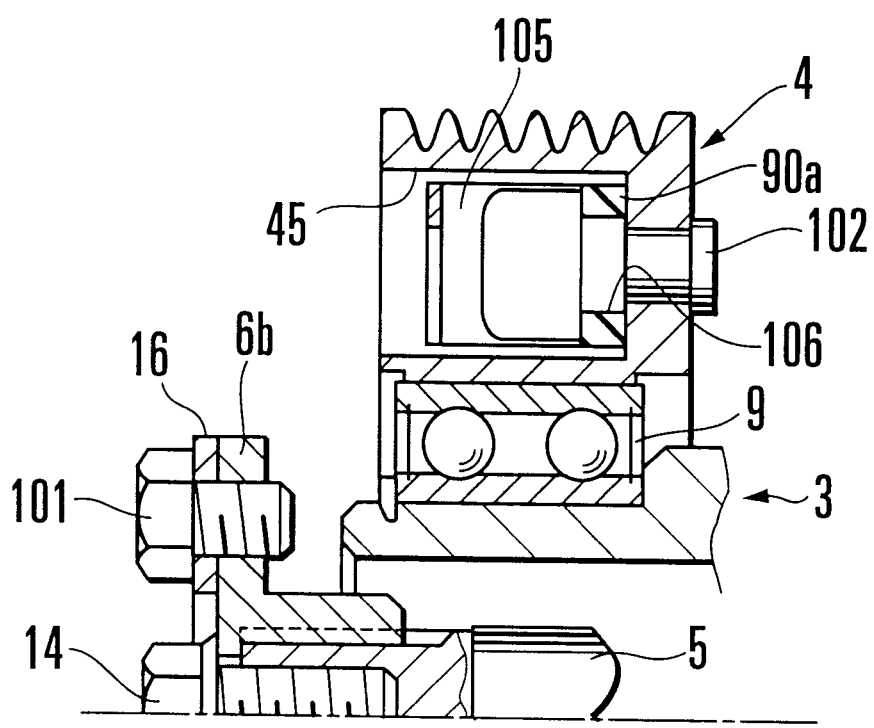
FIG. 30 is a sectional view taken along the line XXXXVIII—XXXXVIII of FIG. 28.
Figure 31:
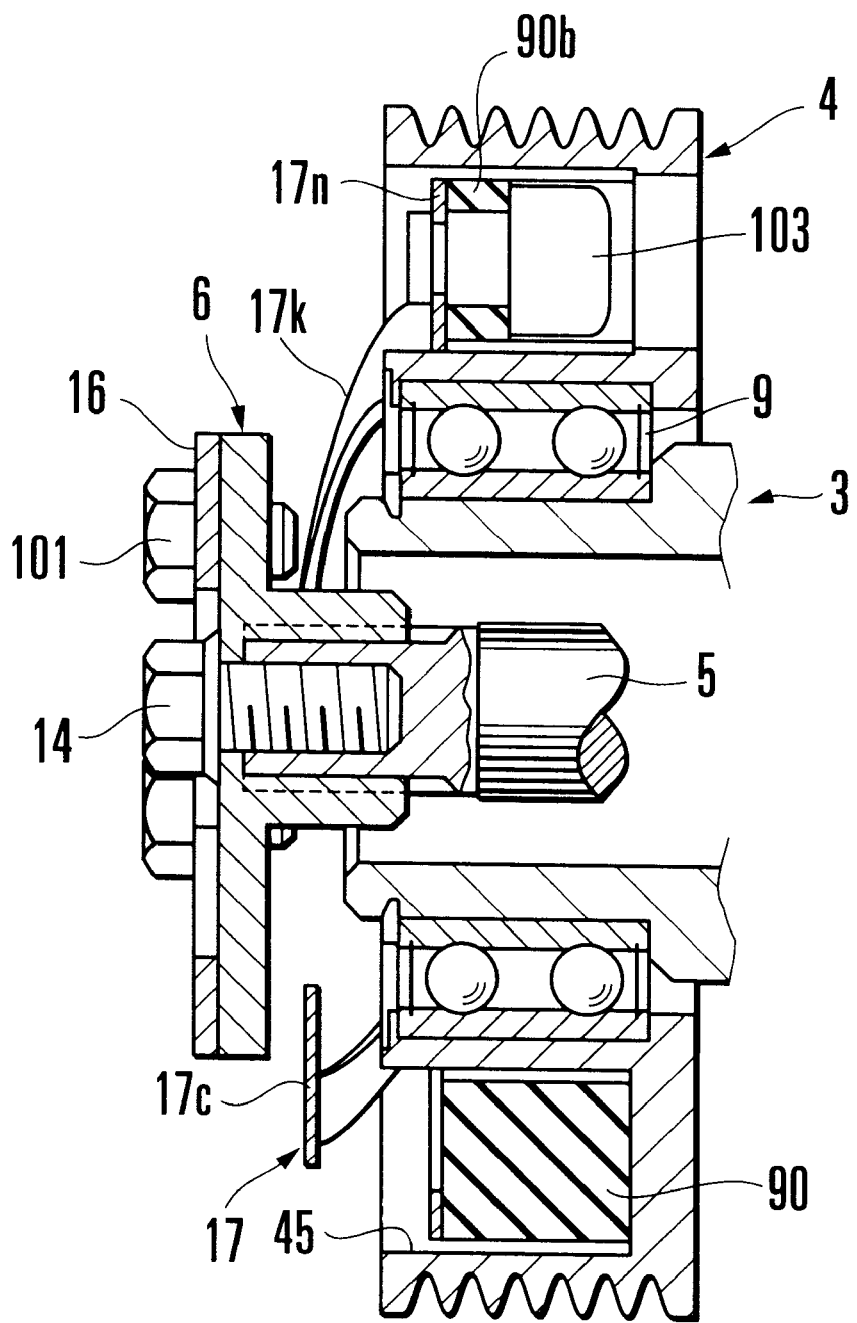
FIG. 31 is a sectional view of a state wherein power transmission is disconnected.

FIGS. 28 to 31 show the ninth embodiment of the present invention, in which FIG. 28 shows a power transmission apparatus, FIG. 29 shows a section taken along the line XXXXVII—XXXXVII of FIG. 28, FIG. 30 shows a section taken along the line XXXXVIII—XXXXVIII of FIG. 28, and FIG. 31 shows a state wherein power transmission is disconnected.

In this embodiment, a pulley 4 is attached to a projection 3A of a housing 3 of a compressor reversely such that its disc plate 4c is located opposite to a hub 6. Connecting portions 17c of an elastic member 17 are sandwiched by the flange surface of the hub 6 and a holding plate 16, and an annular base 17a of the elastic member 17 is connected to the pulley 4 through a damper mechanism 100. The pulley 4 is fabricated by forging a steel member into a cylindrical shape. The damper mechanism 100 is incorporated in an annular recess 45 of the pulley 4.

The holding plate 16 is made of a circular plate having a constant thickness. Three recesses 16a and three holding portions 16b comprised of projections are alternatively formed at the outer periphery of the holding plate 16 in the circumferential direction. Portions between the adjacent holding portions 16b are fixed to the surface of a flange 6b of the hub 6 with bolts 101.

The elastic member 17 is comprised of the annular base 17a, the three connecting portions 17c located inside the annular base 17a equidistantly in the circumferential direction, and three elastic supports 17k which are elastically deformable and connect the connecting portions 17c and annular base 17a to each other. The elastic supports 17k are formed into arcs along the inner periphery of the annular base 17a. Connecting portions 17n of the connecting portions 17c and elastic supports 17k are connected to the pulley 4 through the damper mechanism 100. The connecting portions 17c are integrally formed on the distal ends of the respective elastic supports 17k. The connecting portions 17c project from the inner peripheries of the elastic supports 17k toward the center of the elastic member 17. The connecting portions 17c are inserted between the flange 6b of the hub 6 and the holding portions 16b of the holding plate 16 and sandwiched by the fastening forces of the bolts 101.

The damper mechanism 100 is comprised of a rubber damper 90, three rivets 102, and three rivets 103. The rubber damper 90 is incorporated in the annular recess 45 of the pulley 4. The three rivets 102 fix the rubber damper 90 to the pulley 4. The three rivets 103 fix the annular base 17a of the elastic member 17 to the rubber damper 90.

The rubber damper 90 is formed into a ring having a nonuniform thickness. Those portions of the rubber damper 90 which equally divide the rubber damper 90 into three portions in the circumferential direction and correspond to the rivets 102 form thin portions 90a, each having a recessed left side surface and a through hole 106 where the corresponding rivet 102 extends, as shown in FIG. 30. The rivets 102 are inserted in the annular recess 45 of the pulley 4 in advance, together with the rubber damper 90, before attaching the elastic member 17, and are caulked to the surface of the disc plate 4c of the pulley 4. Those portions of the rubber damper 90 which equally divide the rubber damper 90 into three portions in the circumferential direction and correspond to the rivets 103 form thin portions 90b, each having a recessed right side surface and a through hole 104 where the corresponding rivet 103 extends, as shown in FIG. 29. The connecting portions 17n of the elastic member 17 are fixed to the thin portions 90b with the rivets 103.

In this structure, the connecting portions 17n of the elastic member 17 are fixed to the rubber damper 90 with the rivets 103. The elastic supports 17k are elastically deformed toward the hub 6 to sandwich the connecting portions 17c with the flange 6b of the hub 6 and the holding portions 16b of the holding plate 16. The holding plate 16 is fixed to the hub 6 with the bolts 101. Hence, the pulley 4 and hub 6 are separably connected to each other through a torque limiter mechanism 7. Upon application of an overload, when a rotating shaft 5 is braked and stopped, the connecting portions 17c are disengaged from the flange 6b and holding portions 16b, and the elastic supports 17k are elastically restored, as shown in FIG. 31, to disconnect the pulley 4 and hub 6 from each other, thereby disconnecting power transmission.

In this structure as well, since the rubber damper 90 of the damper mechanism 100 has a ring-like shape, a large damper effect can be obtained, and the stress of the connecting portions 17n of the elastic member 17 acting on the pulley 4 and the stress acting on the connecting portions 17c sandwiched by the hub 6 and holding plate 16 can be reduced. Since the rubber damper 90 has the thin portions 90a and 90b to form a housing portion 105 for housing the heads of the rivets 102 and 103, the rubber holders 87 of the seventh embodiment is not necessary.

The present invention is not limited to the embodiments described above, but various changes and modifications may be made within a range not departing from the gist of the present invention. For example, in the first to fourth embodiments, the bent portions 24 are formed on the connecting portions 17c, to allow the connecting portions 17c of the elastic member 17 to disengage from between the pulley 4 or friction member 15 and the holding plate 16 when an overload is applied to the rotating shaft 5. However, the present invention is not limited to this, but the bent portions 24 may be formed on the holding plate 16. In this case, the rotational direction-side edges of the holding portions 16b of the holding plate 16 may be bent toward the pulley 4 to form bent portions.

Although the elastic member 17 is a leaf spring in the above description, it may be made of an ordinary metal plate or non-metal plate. For example, the elastic member 17 may be made of a synthetic resin material. In fine, the shape, structure, and the material of the components can be altered as far as the components are satisfactory in terms of design, that is, the components have a mechanical strength required for transmitting the power.

What is claimed is:

1. A power transmission apparatus comprising
a driving rotary member rotatably supported on an outer surface of a cylindrical housing of a driven device through a bearing, a driven rotary member attached to a rotating shaft coaxially arranged in said cylindrical housing of said driven device, and a torque limiter mechanism for connecting said driven rotary member and said driving rotary member to each other and limiting torque transmission from said driving rotary member to said driven rotary member when an overload is applied to said driven rotary member, said torque limiter mechanism having
a plurality of holding portions fixed to either one of said driving rotary member and said driven rotary member and aligned substantially equidistantly in a circumferential direction,
an opposing portion provided to either one of said driving rotary member and said driven rotary member and opposing said holding portions, and
an elastic member frictionally connected to said holding portions and said opposing portion and fixed to the remaining one of said driving rotary member and said driven rotary member, said elastic member having
connecting portions frictionally connected to said holding portions and said opposing portion and corresponding in number to said holding portions, and
an elastic support fixed to the remaining one of said driving rotary member and said driven rotary member and imparted with an elastic restoration force for disengaging said connecting portions toward either one of upper and lower surfaces of said holding portions,
wherein said connecting portions and said holding portions, and said connecting portions and said opposing portion are frictionally connected to each other, and said elastic support elastically deforms in an axial direction.

2. An apparatus according to claim 1, wherein said elastic member is made of a metal plate having spring properties.

3. An apparatus according to claim 2, wherein said elastic member has said connecting portions aligned at predetermined gaps in a rotational direction and frictionally connected to said holding portions and said opposing portion, and said elastic support formed into an arc to connect said connecting portions to either one of said driving rotary member and said driven rotary member.

4. An apparatus according to claim 3, wherein said elastic support and said connecting portions are located on the same circumference where said holding portions are.

5. An apparatus according to claim 1, wherein at least either one of those surfaces of said holding portions and that surface of said opposing portion, which oppose each other, is provided with a friction member having a large static frictional coefficient.

6. An apparatus according to claim 1, wherein said holding portions have locking portions and said connecting portions have engaging portions to engage with said locking portions.

7. An apparatus according to claim 1, wherein said plurality of holding portions are arranged on an inner or outer periphery of a disc-like holding plate fixed to either one of said driving rotary member and said driven rotary member in a circumferential direction, to alternate with a plurality of recesses.

8. An apparatus according to claim 7, wherein said plurality of holding portions are formed on a disc-like holding plate made of a metal plate elastically deformable in a direction of thickness, and said holding plate is fixed to either one of said driving rotary member and said driven rotary member, so that said holding portions press said connecting portions of said elastic member against said opposing portion of either one of said driving rotary member and said driven rotary member that opposes said holding portions.

9. An apparatus according to claim 1, wherein said elastic member is formed with a disc-like elastic support having a plurality of elongated holes which are long in a circumferential direction.

10. An apparatus according to claim 1, wherein said elastic support is formed of a cylindrical or ring-shaped rubber member expandable in the axial direction.

11. An apparatus according to claim 1, wherein said torque limiter mechanism has said plurality of holding portions fixed to said driving rotary member and aligned substantially equidistantly in the circumferential direction, said opposing portion (disc plate) provided to said driving rotary member and opposing said holding portions, and said elastic member frictionally connected to said holding portions and said opposing portion and fixed to said driven rotary member, and said elastic member has said connecting portions frictionally connected to said holding portions and said opposing portion and corresponding in number to said holding portions, said elastic support fixed to said driven rotary member and imparted with an elastic restoration force for disengaging said connecting portions toward said upper surfaces of said holding portions, and bent portions respectively formed on said connecting portions on a counter rotational direction-side end of said driving rotary member and bent toward said upper surfaces of said holding portions.

12. An apparatus according to claim 1, wherein said torque limiter mechanism has said plurality of holding portions fixed to said driven rotary member and aligned substantially equidistantly in the circumferential direction, said opposing portion (flange) provided to said driven rotary member and opposing said holding portions, and said elastic member frictionally connected to said holding portions and said opposing portion and connected to said driving rotary member, said elastic member has said connecting portions frictionally connected to said holding portions and said opposing portion and corresponding in number to said holding portions, and said elastic support connected to said driving rotary member and imparted with an elastic restoration force for disengaging said connecting portions toward said lower surfaces of said holding portions, and said elastic member is connected to said driving rotary member through a damper mechanism.

* * * * *

UNITED STATES PATENT AND TRADEMARK OFFICE
CERTIFICATE OF CORRECTION

PATENT NO.   : 6,200,221 B1                                                             Page 1 of 1
DATED        : March 13, 2001
INVENTOR(S)  : Maejima et al.

It is certified that error appears in the above-identified patent and that said Letters Patent is hereby corrected as shown below:

<u>Title page,</u>
Item [56], References Cited, FOREIGN PATENT DOCUMENTS, delete "12-179569" and insert -- 2000-179568 --.

Signed and Sealed this

Second Day of April, 2002

Attest:

Attesting Officer

JAMES E. ROGAN
*Director of the United States Patent and Trademark Office*